(12) United States Patent
Barrett et al.

(10) Patent No.: US 11,700,351 B2
(45) Date of Patent: *Jul. 11, 2023

(54) VIRTUAL EYE CONTACT IN VIDEO INTERACTION

(71) Applicant: See I2I Pty Ltd, Nedlands (AU)

(72) Inventors: Graham Barrett, City Beach (AU); Michael Winlo, Nedlands (AU)

(73) Assignee: See I2I Pty Ltd, Nedlands (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/397,131

(22) Filed: Aug. 9, 2021

(65) Prior Publication Data

US 2022/0210368 A1 Jun. 30, 2022

Related U.S. Application Data

(63) Continuation of application No. 17/097,819, filed on Nov. 13, 2020, now Pat. No. 11,089,262.

(51) Int. Cl.
*H04N 7/14* (2006.01)
*H04N 7/15* (2006.01)

(52) U.S. Cl.
CPC .............. *H04N 7/144* (2013.01); *H04N 7/15* (2013.01)

(58) Field of Classification Search
CPC ................................ H04N 7/144; H04N 7/14
See application file for complete search history.

(56) References Cited

U.S. PATENT DOCUMENTS

| | | | |
|---|---|---|---|
| 5,400,069 A | 3/1995 | Braun et al. | |
| 5,619,254 A | 4/1997 | McNelley et al. | |
| 5,675,376 A | 10/1997 | Andersson et al. | |
| 6,710,797 B1 * | 3/2004 | McNelley | H04N 7/144 348/14.09 |
| 6,882,358 B1 | 4/2005 | Schuster et al. | |
| 7,515,174 B1 | 4/2009 | Francisco et al. | |
| 8,022,977 B2 | 9/2011 | Kanade et al. | |
| 8,816,958 B2 | 8/2014 | Kalu et al. | |

(Continued)

FOREIGN PATENT DOCUMENTS

WO WO 03043325 5/2003

OTHER PUBLICATIONS

Alibaba.com [online], "Wholesale Price 2mm 3mm 3.2mm Transparent teleprompter beam splitter mirror glass," published on or before Nov. 13, 2020, retrieved on Nov. 30, 2020, retrieved from URL<https://www.alibaba.com/product-detail/Wholesale-Price-2mm-3mm-3-2mm_62345959902.html?_redirected_=1>, 15 pages.

(Continued)

*Primary Examiner* — Olisa Anwah
(74) *Attorney, Agent, or Firm* — Fish & Richardson P.C.

(57) ABSTRACT

Among other things, a first video is captured of at least the eyes of a first person who is looking along a video capture axis. A second video of at least the eyes of a second person is presented, along a display axis. The video capture axis and the display axis are aligned along a common axis so that the first person can view the second video of at least the eyes of the second person along the common axis when the first video of the eyes of the first person is being captured along the common axis. Instructions are executed to maintain an eye contact video interaction session between the first person and the second person using the captured video and the presented video.

22 Claims, 22 Drawing Sheets

(56) References Cited

U.S. PATENT DOCUMENTS

| | | | |
|---|---|---|---|
| 8,878,895 B2 | 11/2014 | Yoon | |
| 8,941,715 B1 | 1/2015 | McNelley et al. | |
| 9,832,556 B2* | 11/2017 | Akino | H01R 13/187 |
| 11,239,667 B2* | 2/2022 | Chien | H01R 25/006 |
| 2004/0165060 A1 | 8/2004 | McNelley et al. | |
| 2006/0209530 A1* | 9/2006 | Schaak | G11B 33/06 |
| | | | 362/86 |
| 2007/0002130 A1 | 1/2007 | Hartkop | |
| 2010/0182513 A1* | 7/2010 | DeOtte | H04N 5/2222 |
| | | | 348/E5.022 |
| 2013/0329431 A1* | 12/2013 | Lin | F21S 6/003 |
| | | | 362/253 |
| 2014/0247497 A1 | 9/2014 | Giraldo | |
| 2015/0068432 A1* | 3/2015 | Wagner | A47B 21/0314 |
| | | | 108/3 |
| 2015/0097917 A1 | 4/2015 | Gish | |
| 2015/0138303 A1 | 5/2015 | White | |
| 2015/0346774 A1* | 12/2015 | Marquardt | F21V 33/0052 |
| | | | 362/253 |
| 2016/0238235 A1* | 8/2016 | Garrett | G09F 9/301 |
| 2019/0037307 A1 | 1/2019 | Zimmerman et al. | |
| 2019/0260962 A1* | 8/2019 | Karon | H04N 5/2254 |
| 2022/0057078 A1* | 2/2022 | Reed | G16Y 10/75 |

OTHER PUBLICATIONS

Altronics.com.au [online], "12V DC 1A Appliance Power Supply Adapter," published on or before Nov. 13, 2020, retrieved on Nov. 18, 2020, retrieved from URL<https://www.altronics.com.au/p/m8932b-powertran-12v-dc-1a-fixed-2.1mm-tip-appliance-plugpack/>, 2 pages.
Amazon.com [online], "See Eye 2 Eve—webcam teleprompter & eye contact device for video chatting with computers using external webcams," published on or before Nov. 13, 2020, retrieved on Nov. 18, 2020, retrieved from URL<https://www.amazon.com/See-Eye-teleprompter-chatting-computers/dp/B000N28MB4/ref=cm_cr_arp_d_product_top?ie=UTF8>,7 pages.
Amazon.com.au [online], "LILLIPUT A7S 7 Inch IPS On-Camera Monitor with 4K HDMI Input Output, 1920×1200 Field Monitor for DSLR and Mirrorless Camera with Histogram False Color Peaking," May 9, 2018, retrieved on Nov. 18, 2020, retrieved from URL<https://www.amazon.com.au/LILLIPUT-Camera-1920×1200-Mirrorless-Histogram/dp/B07CYS1Y3W/ref=sr_1_1?dchild=1&keywords=lilliput+A7s+7+inch+on+camera+field+monitor&qid=1605734139&sr=8-1>, 5 pages.
Amazon.com.au [online], "Neewer Portable 70 inches/177 Centimeters Aluminum Alloy Camera Tripod Monopod with 3-way Swivel Pan Head," Nov. 14, 2017, retrieved on Nov. 30, 2020, retrieved from URL<https://www.amazon.com.au/Neewer-Portable-177centimeters-Camcorder-kilograms/dp/B0742BBTPD/ref=sr_1_1?dchild=1&keywords=neewer+centimeters+portable+camcorder&qid=1606771586&sr=8-1>, 9 pages.
Amazon.com.au [online], "Razer RZ20-02850100-R3U1 Ripsaw HD Game Streaming Capture Card: 4K Passthrough—1080P FHD 60 FPS Recording—Compatible w/PC, PS4, Xbox One, Nintendo Switch," Apr. 8, 2019, retrieved on Nov. 30, 2020, retrieved from URL<https://www.amazon.com.au/Razer-Ripsaw-Game-Streaming-Capture/dp/B07Q2X651Z/ref=sr_1_2?dchild=1&keywords=razer+ripsaw&qid=1606770671&sr=8-2>, 6 pages.
Bodelin.com [online], "New! ProPrompter Desktop," Apr. 5, 2018, retrieved on Nov. 18, 2020, retrieved from URL<https://www.bodelin.com/proprompter/product/new-proprompter-desktop/>, 4 pages.
Carbatec.com.au [online], "Hardware Fitting Kit—¼" Thread," published on or before Nov. 13, 2020, retrieved on Nov. 30, 2020, retrieved from URL<https://www.carbatec.com.au/149pce-knob-jig-pack-1-4>, 1 page.
E2esoft.com [online], "iVCam," published on or before Nov. 30, 2020, retrieved on Dec. 2, 2020, retrieved from URL<https://www.e2esoft.com/ivcam/>, 4 pages.
Elgato.com [online], "Cam Link 4K: Unleash Your Camera," published on or before Nov. 13, 2020, retrieved on Nov. 30, 2020, retrieved from URL<https://www.elgato.com/en/gaming/cam-link-4k>.
Fastcompany.com [online], "Errol Morris's Secret Weapon for Unsettling Interviews: The Interrotron," Sep. 30, 2016, retrieved on Nov. 18, 2020, retrieved from URL<https://www.fastcompany.com/1663105/errol-morriss-secret-weapon-for-unsettling-interviews-the-interrotron>, 6 pages.
itotd.com [online], "Eye-to-Eye Video," Oct. 16, 2018, retrieved on Nov. 18, 2020, retrieved from URL<https://itotd.com/articles/5279/eye-to-eye-video/>, 3 pages.
Leedervillecameras.com.au [online], "Prompt It Maxi Teleprompter Kit," Aug. 1, 2017, retrieved on Nov. 18, 2020, retrieved from URL<https://www.leedervillecameras.com.au/products/accessories/studio-equipment/prompt-it-maxi-teleprompter-kit>, 7 pages.
Logitech.com [online], "Logitech Streamcam," published on or before Nov. 13, 2020, retrieved on Nov. 30, 2020, retrieved from URL<https://www.logitech.com/en-us/products/webcams/streamcam.960-001289.html?crid=34>, 11 pages.
Ma.tt [online], "Stream Like a CEO," May 29, 2020, retrieved on Nov. 18, 2020, retrieved from URL<https://ma.tt/2020/05/ceo-video-streaming/>, 16 pages.
International Search Report and Written Opinion in International Appln. No. PCT/AU2021/051350, dated Jan. 25, 2022, 10 pages.
Youtube.com [online], "Setup the eye to eye video conferencing system," Sep. 3, 2020, retrieved on Jul. 19, 2022, retrieved from URL<https://www.youtube.com/watch?v=i_GGhZWHYoA>, 14 pages.
Youtube.com [online], "Weird webcam mod that enables eye-contact conversation," May 27, 2020, retrieved on Jul. 19, 2022, retrieved from URL<https://www.youtube.com/watch?v=2AecAXinars>, 9 pages.
teleprompmirror.com [online], "Glass teleprompter mirror," Oct. 6, 2017, retrieved on Jan. 17, 2023, retrieved from URL<https://teleprompmirror.com/glass-teleprompter-mirror/>, 21 pages.

* cited by examiner

VIRTUAL EYE CONTACT IN VIDEO INTERACTION

This application is a continuation application of and claims priority to U.S. application Ser. No. 17/097,819, filed on Nov. 13, 2020.

BACKGROUND

This description relates to virtual eye contact in video interaction.

Many conventional live face-to-face interactions (in which two or more people are physically near enough to be able to see and hear one another) are being replaced by video interactions. In typical video interactions, two or more people who are physically separate can see and hear real-time digital video and audio presentations of one another. The digital presentations are carried between the participants electronically, for example, over a communication network such as the Internet.

Popular contexts for such video interactions include meetings, video calls, conferences, webinars, medical appointments, parties, social gatherings, classes, podcasts, lectures, seminars, board meetings, discussion groups, and others. Among the advantages of video interactions can be cost savings, reduced travel, less formality, more spontaneity, flexibility in the number, locations, and categories of participants, and availability of supplemental features and controls. In 2020, the social distancing that was encouraged to reduce the spread of the COVID-19 virus prompted a significant increase in video interactions relative to face-to-face interactions.

Types of video interactions include video conferences that are facilitated by a variety of Web-based and software platforms including FaceTime and other mobile-device-based systems, and videoconference systems such as Zoom, SKYPE, Google Meet, and Microsoft Teams.

Participants in live face-to-face interactions typically can look directly at each other's eyes, can gauge each other's facial expressions and body language, and can hear subtle nuances in the timbre of each other's voices and articulation of speech.

In live face-to-face interaction, when one person is looking at the eyes of another person, we can say that the first person "projects eye contact" to the other person. Then, if the other person is looking at the first person's eyes, we can say that the other person "perceives eye contact" of the first person. If the other person is not looking at the first person's eyes, the other person also cannot perceive eye contact projected by the first person. Therefore, when two people are looking at each other during a live face-to-face interaction, each of them is both projecting eye contact and perceiving eye contact; we sometimes say they are engaged in "live eye-to-eye contact". In other words, in live face-to-face interactions, when one person is perceiving eye contact, then eye-to-eye contact between the two people is necessarily occurring.

Eye-to-eye contact is an especially powerful and engaging feature of live face-to-face interaction.

In a live face-to-face interaction, a person projects eye contact along what we can call a "gazing axis" and perceives eye contact along what we can call a "viewing axis". During live eye-to-eye contact, the gazing axes and the viewing axes of both people are all aligned.

SUMMARY

In general, in an aspect, a first video is captured of at least the eyes of a first person who is looking along a video capture axis. A second video of at least the eyes of a second person is presented, along a display axis. The video capture axis and the display axis are aligned along a common axis so that the first person can view the second video of at least the eyes of the second person along the common axis when the first video of the eyes of the first person is being captured along the common axis. Instructions are executed to maintain an eye contact video interaction session between the first person and the second person using the captured video and the presented video.

Implementations can include one or a combination of two or more of the following features. The eye contact video interaction session includes a video conference. A user interface is presented to enable the first person to control the eye contact video interaction session through the user interface. The first video is captured by a discrete camera dedicated to capturing videos along the video capture axis. The first video is captured by a camera of a mobile device aligned with the video capture axis. The second video is presented by a discrete display dedicated to presenting videos along the display axis. The second video is presented by a display of a mobile device aligned with the display axis. The instructions are executed on a discrete computational device that is dedicated to executing instructions to maintain the eye contact video interaction session.

The instructions are executed on a computational device that also executes other instructions unrelated to the instructions to maintain the eye contact video interaction session.

In general, in an aspect, an apparatus includes a case. On the case are a video camera or a camera support for a video camera or for a mobile device having a video camera; a video display or a display support for a video display or for a mobile device having a video display; and an axis alignment device configured to align a video capture axis of the video camera and a display axis of the video display along a common axis so that a first person can view a real-time video of at least the eyes of a second person along the common axis when the video camera is capturing at least the eyes of the first person looking along the common axis toward the video camera. On the case or in a support for the case, there is a computational device or a connector for connection to a computational device or to a mobile device serving as a computational device, the computational device being configured to maintain an eye contact video interaction session between the first person and the second person using an output of the video camera and an input of the video display.

Implementations can include one or a combination of two or more of the following features. The axis alignment device includes a beam splitter. The computational device includes a mobile device. The computational device includes a small-form-factor computer. A support holds the case in a position and orientation such that the common axis extends to a position between the eyes of the first person. The eye contact video interaction session includes a video conference. The eye contact video interaction session is between a first person and a second person who are within the same building or the same space. The eye contact video interaction session is between a first person and a second person who are not with the same building or the same space. A second computational device for executing instructions to provide functions in addition to maintaining the eye contact video interaction session. The video display includes the video display of the mobile device, the mobile device serves as the computational device to maintain the eye contact video interaction session, and the video camera includes a discrete dedicated video camera configured to provide a video signal to the computational device of the mobile device. The mobile device serves as the computational device to maintain the eye contact video interaction session and the mobile device mirrors its display to the video display of the apparatus. A camera of the mobile device serves as the video camera of the apparatus and as the computational device to maintain the eye contact video interaction session. A wireless mouse and keyboard control the computational device. A wireless speaker or microphone or both serve as a speaker or microphone for the mobile device. There is a support for the case and electronic components in the base including one or more of a microphone, a speaker, and a computational device. There is a light source on the case.

In general, in an aspect, an apparatus has a beam splitter having a front surface and a rear surface. A video sensor and an optical lens are mounted at a location that faces the rear surface of the beam splitter. The optical lens has an optical axis extending from the video sensor through the beam splitter. A video display is at a location that faces the front surface of the beam splitter. A mechanism associated with the beam splitter and the video display enables an open configuration in which a reflection of a screen of the video display is visible from a location facing the front surface of the beam splitter, and a closed configuration in which the reflection of the video display is not visible from the location facing the front surface of the beam splitter.

Implementations can include one or a combination of two or more of the following features. The mechanism includes a hinge coupled between the beam splitter and the video display and configured to enable relative motion of the beam splitter and the video display between the open configuration and the closed configuration. A light provides illumination in the vicinity of the apparatus. The light is exposed in both the open configuration and the closed configuration. A supporting structure holds the beam splitter, sensor, optical lens, display, and mechanism at a height above a work surface. A case holds the beam splitter, the video sensor, the optical lens, the video display and the mechanism. There is a stand and a base and the case is supported on the stand.

In general, in an aspect, a hand-held device includes: a hand grip; an assembly connected to the hand grip and including a video camera or a camera support for a video camera or for a mobile device having a video camera; a video display or a display support for a video display or for a mobile device having a video display; an axis alignment device configured to align a video capture axis of the video camera and a display axis of the video display along a common axis so that a first person holding the hand grip can view a real-time video of at least the eyes of a second person along the common axis when the video camera is capturing at least the eyes of the first person looking along the common axis toward the video camera; and a computational device or a connector for connection to a computational device or to a mobile device serving as a computational device, the computational device being configured to maintain an eye contact video interaction session between the first person and the second person using an output of the video camera and an input of the video display.

In general, in an aspect, at a first location, a device performs at least the following activities: capturing a first video of at least the eyes of a first person who is at the first location and is looking along a video capture axis; presenting a second video of at least the eyes of a second person who is at a second location, along a display axis; aligning the video capture axis and the display axis along a common axis so that the first person can view the second video of at least the eyes of the second person along the common axis when the first video of the eyes of the first person is being captured along the common axis; and executing instructions to maintain an eye contact video interaction session between the first person and the second person using the captured video and the presented video. At the second location, the second person controls at least one of the capturing of the first video, the presenting of the second video, and the executing of the instructions by information communicated from the second location to the first location.

In general, in an aspect, at a first location, a first device performs at least the following activities: capturing a first video of at least the eyes of a first person who is at the first location and is looking along a first video capture axis of the first device; presenting a second video of at least the eyes of a second person who is at a second location, along a display axis of the first device; aligning the video capture axis and the display axis of the first device along a common axis so that the first person can view the second video of at least the eyes of the second person along the common axis when the first video of the eyes of the first person is being captured along the common axis; and executing instructions to maintain an eye contact video interaction session between the first person and the second person using the captured video and the presented video, and at the first location; a second device performing at least the following activities: capturing a third video of at least the eyes of the first person who is at the first location and is looking along a video capture axis of the second device; presenting a fourth video of at least the eyes of a third person who is at a third location, along a display axis of the second device; aligning the video capture axis and the display axis of the second device along a common axis so that the first person can view the fourth video of at least the eyes of the third person along the common axis when the third video of the eyes of the first person is being captured along the common axis; and executing instructions to maintain an eye contact video interaction session between the first person and the third person using the captured video and the presented video.

In general, in an aspect, at a first location, an eye-to-eye interaction device performs at least the following activities: capturing a first video of at least the eyes of a first person who is at the first location and is looking along a video capture axis; presenting a second video of at least the eyes of a second person who is at a second location, along a display axis; and aligning the video capture axis and the display axis along a common axis so that the first person can view the second video of at least the eyes of the second person along the common axis when the first video of the eyes of the first person is being captured along the common axis. A computational device situated at the first location and in communication with the eye-to-eye interaction device executes instructions to maintain an eye contact video interaction session between the first person and the second person using the captured video and the presented video.

In general, in an aspect, at a first location, performs at least the following activities: capturing a first video of at least the eyes of a first person who is at the first location and is looking along a video capture axis; presenting a second video of at least the eyes of a second person who is at a second location, along a display axis; and a first device aligning the video capture axis and the display axis along a common axis so that the first person can view the second video of at least the eyes of the second person along the common axis when the first video of the eyes of the first person is being captured along the common axis. The first video is captured by a camera of a mobile phone or tablet or the second video being presented by a display of the mobile phone or tablet, or both. Instructions are executed to maintain an eye contact video interaction session between the first person and the second person using the captured video and the presented video.

In general, in an aspect, at a first location, at least the following activities are performed: capturing a first video of at least the eyes of a first person who is at the first location and is looking along a video capture axis, the first video being captured by a camera of a mobile phone or tablet and communicated by the mobile phone or tablet to a computational device; presenting a second video of at least the eyes of a second person who is at a second location, along a display axis; and aligning the video capture axis and the display axis along a common axis so that the first person can view the second video of at least the eyes of the second person along the common axis when the first video of the eyes of the first person is being captured along the common axis. At the computational device, instructions are executed to maintain an eye contact video interaction session between the first person and the second person using the captured video and the presented video.

In general, in an aspect, at a location at which a first person and a second person are in physical proximity to one another but cannot engage in live eye-to-eye interaction, at least the following activities are performed: capturing a first video of at least the eyes of the first person who and is looking along a video capture axis; presenting a second video of at least the eyes of the second person along a display axis; and aligning the video capture axis and the display axis along a common axis so that the first person can view the second video of at least the eyes of the second person along the common axis when the first video of the eyes of the first person is being captured along the common axis; and executing instructions to maintain an eye contact video interaction session between the first person and the second person using the captured video and the presented video.

In general, in an aspect, at a first location of a provider of health care services, a device performs at least the following activities: capturing a first video of at least the eyes of the health care services provider who is looking along a video capture axis; presenting a second video of at least the eyes of a person who is a recipient of health care services and who is at a second location, along a display axis; aligning the video capture axis and the display axis along a common axis so that the provider can view the second video of at least the eyes of the recipient along the common axis when the first video of the eyes of the provider is being captured along the common axis; and executing instructions to maintain an eye contact video interaction session between the provider and the recipient using the captured video and the presented video.

In general, in an aspect, at a first location of a security agent, a device performs at least the following activities: capturing a first video of at least the eyes of the security who is looking along a video capture axis; presenting a second video of at least the eyes of a person who seeks access to the first location and who is at a second location in a vicinity of the first location, along a display axis; aligning the video capture axis and the display axis along a common axis so that the security agent can view the second video of at least the eyes of the person who seeks access along the common axis when the first video of the eyes of the security agent is being captured along the common axis; and executing instructions to maintain an eye contact video interaction session between the security agent and the person who seeks access using the captured video and the presented video.

Among other advantages, implementations of the eye contact interaction technology can significantly improve the video interaction experience between two or more participants among other things by improving the fidelity of all of the visual and audio components and restoring direct, eye-to-eye level communication among the participants. In a business context, the technology can help to improve two-way communication between remotely located participants (for example in a work-from-home environment) and impart to such communication some of the spontaneity and dynamics that characterize modern open office arrangements. The eye contact interaction device can operate as a self-contained device (needing no other hardware) or can be connected to another computer via cable or wirelessly.

These and other aspects, features, implementations, and advantages (a) can be expressed as methods, apparatus, systems, components, program products, business methods, means or steps for performing functions, and in other ways, and (b) will become apparent from the following description and from the claims.

DESCRIPTION

FIGS. 1, 2, 5 through 10, 14, and 15 are schematic diagrams of interaction devices.

Figure 16:
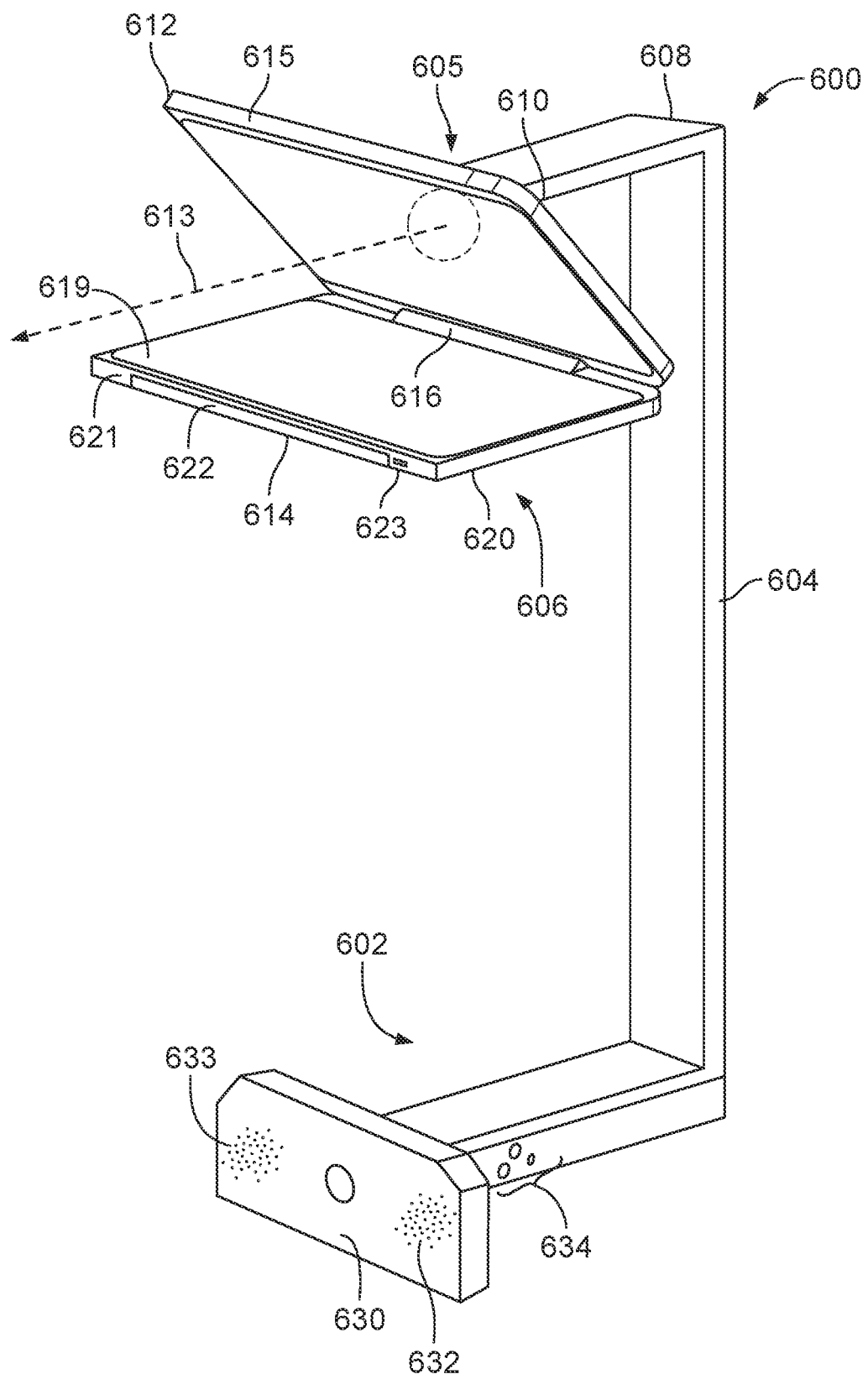
Figure 21:
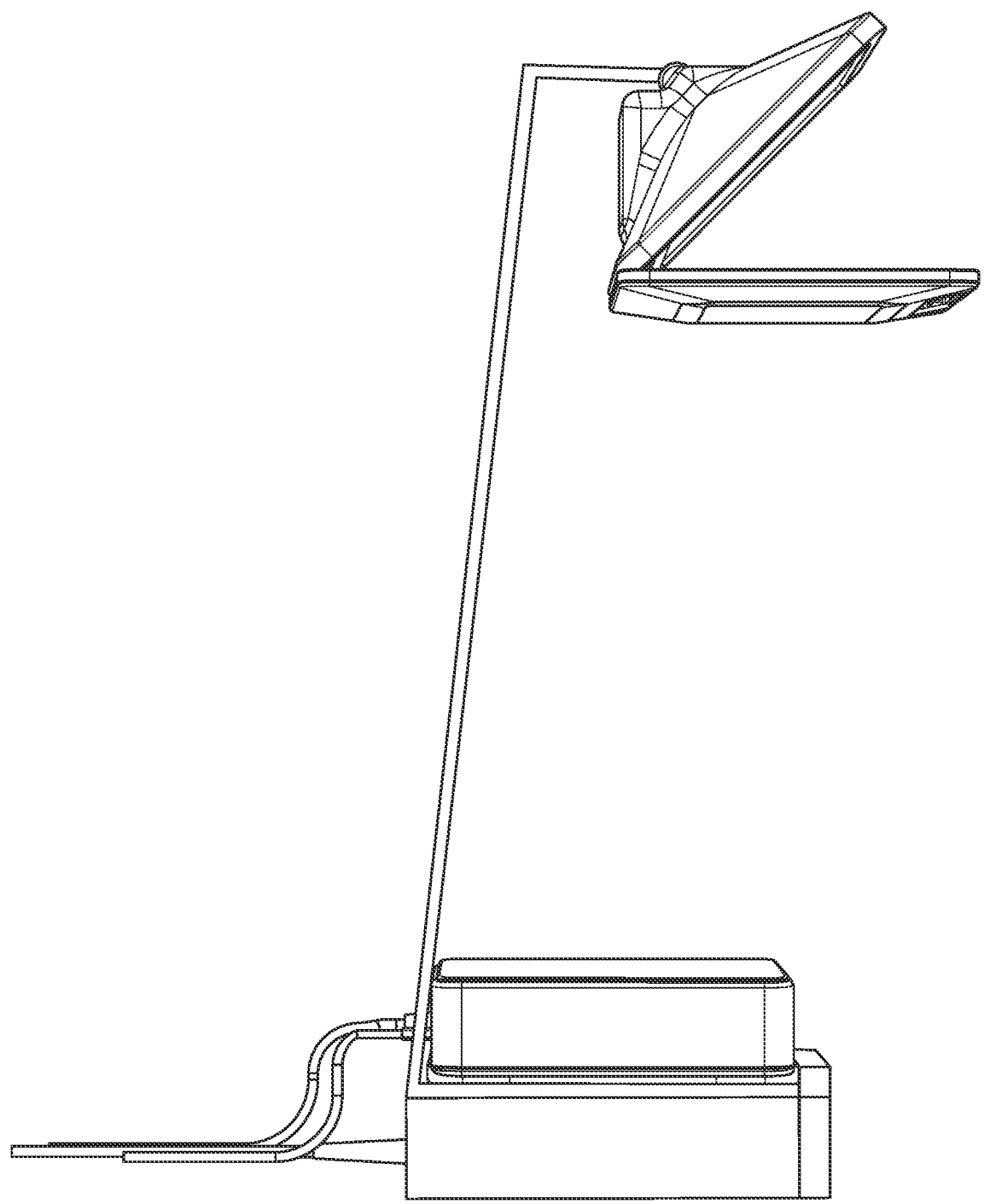

FIGS. 16, through 21 are views of an interaction device.

Figure 22:
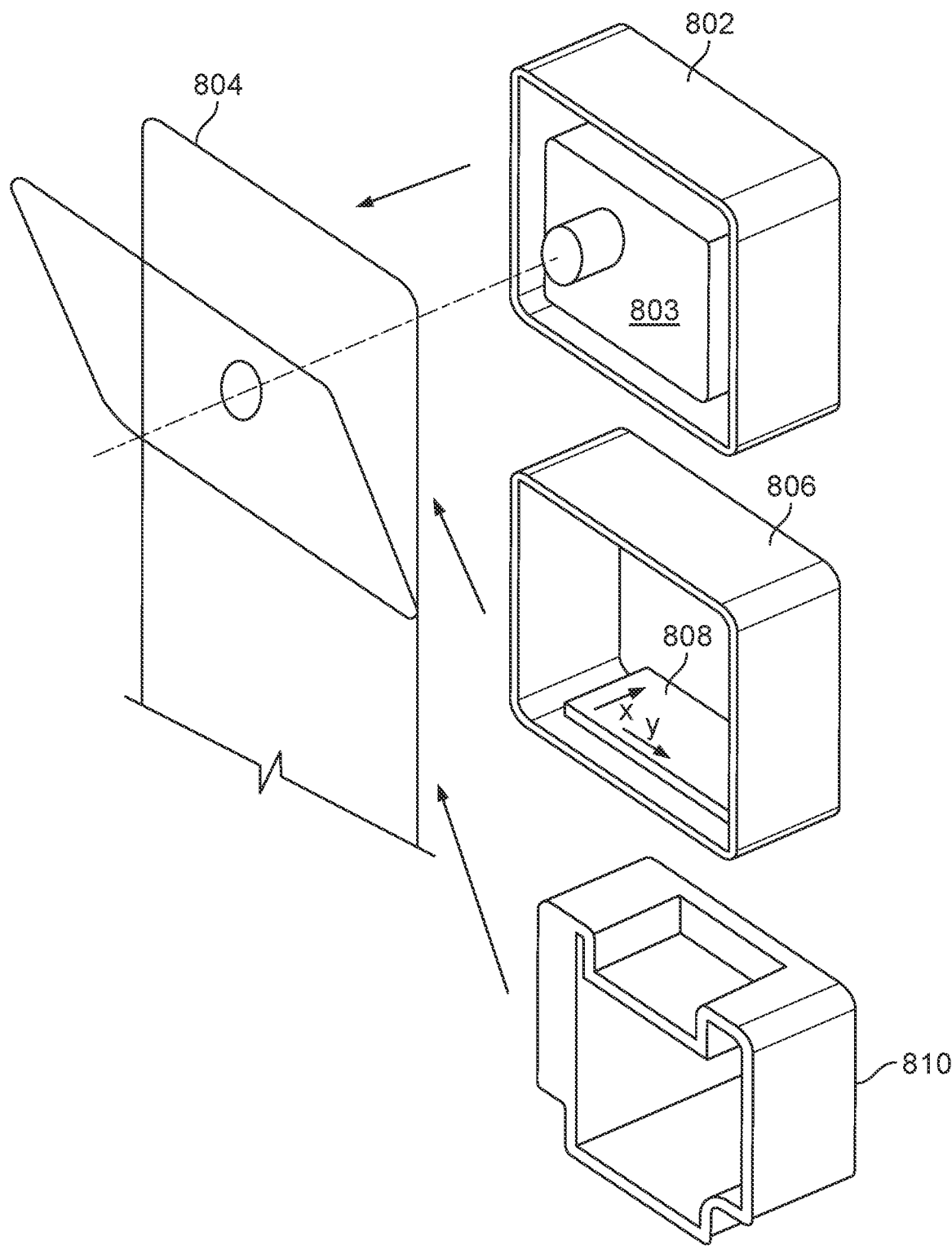

FIG. 22 is a view of an interaction device.

During a video interaction, projection of eye contact and perception of eye contact and the alignment of the gazing axes and viewing axes occur differently than for live face-to-face interaction. We sometimes refer to eye contact that occurs during a video interaction as "virtual eye contact".

In video interaction, the display axis of the video display and the video capture axis of the video camera, although parallel, are separated by a distance of a few or many inches or even feet. Therefore when a local participant is viewing the video display (that is, has his viewing axis aligned with the display axis of the video display), his gazing axis is also necessarily aligned with the display axis of the video display, not with the video capture axis of the video camera. Therefore, the local participant will not project eye contact to the remote participant and the remote participant will not perceive eye contact. Similarly, when the local participant has his gazing axis aligned with the video capture axis of the video camera, his viewing axis is also aligned with the video capture axis. Then the local participant can project eye contact but cannot perceive eye contact, and the remote participant can perceive eye contact but cannot project eye contact to the local participant. In other words, virtual eye-to-eye contact cannot occur.

Unlike live face-to-face interaction, in video interaction, it is possible to perceive eye contact or to project eye contact even though eye-to-eye contact is not possible. While not as robust and effective as eye-to-eye contact, the perceived eye contact and projected eye contact that occur as part of a video interaction are useful to participants. In addition, in video interactions, the resolution of the video presentation and the fidelity of the sound are limited especially because of technology limitations of cameras, displays, microphones, and speakers embedded in computing devices and mobile phones. Supplemental devices such as external cameras, displays, microphones, and speakers can enhance the experience of participants in video interactions.

Unlike in live face-to-face interactions, in which it is natural for a participant to project eye contact, in video interactions a person must consciously work to project eye contact by looking directly at the video camera. For non-professional participants in video interactions, looking directly at the video camera can be arduous, and most individuals' eyes roam or their axes of gaze are aimed other than along the video capture axis of the video camera for substantial portions of a video interaction. Even a small misalignment of the local participant's axis of gaze relative to the video capture axis of the video camera can be disconcerting to a remote participant, and thus a key element of effective human communication is typically absent or reduced in video interactions.

Overall, for these and other reasons, typical video interactions are often less engaging or powerful and more disconcerting and unsatisfying than live face-to-face interactions.

Various techniques have been used to encourage the projection of eye contact in certain contexts.

In teleprompters used by the movie and TV industries, a beam splitter can present textual material along a display axis to be read by the user while the participant is simultaneously directing his axis of gaze along the video capture axis of a video camera. Teleprompters typically present the textual material at a display; the displayed textual material is reflected by a partially reflective mirror of the beam splitter while the video camera captures video of the individual reading the material. As a result, the reader appears to project eye contact to an individual viewing the video captured by the video camera as part of a real-time broadcast or a recorded film or video. Teleprompters do not present to the reader a real-time image or video of an individual who is remotely viewing the reader reading the textual material.

In some inexpensive teleprompters, the integrated display is replaced by an existing display of a smart phone or tablet, and a separate computer is not required to generate the text for display. Although the smart phone or tablet can provide the display, its embedded video camera cannot simultaneously replace the video camera of the teleprompter because the video capture axis is offset from the display axis of the display so that the reader cannot project eye contact.

Systems have been proposed for video interaction using beam splitter techniques that align a participant's viewing axis for viewing the display with the participant's axis of gaze captured by the video camera.

In one commercially available device (https://www.bodelin.com/proprompter/product/new-proprompter-desktop/), two mirrors are used to reflect the portion of the display of a computer or mobile device that is presenting the conventional video of the video interaction. The two mirrors are oriented like the mirrors of a periscope to enable the participant to look at a camera connected to the computer device and therefore effectively to project eye contact to the person with whom he is interacting, while also viewing that other person. This device may be considered cumbersome and obscures a significant portion of the device display from viewing by the participant.

In other proposed devices, one or more cameras are embedded in a display or are associated with a semitransparent display to enable eye-to-eye contact.

The Technology

Figure 1:
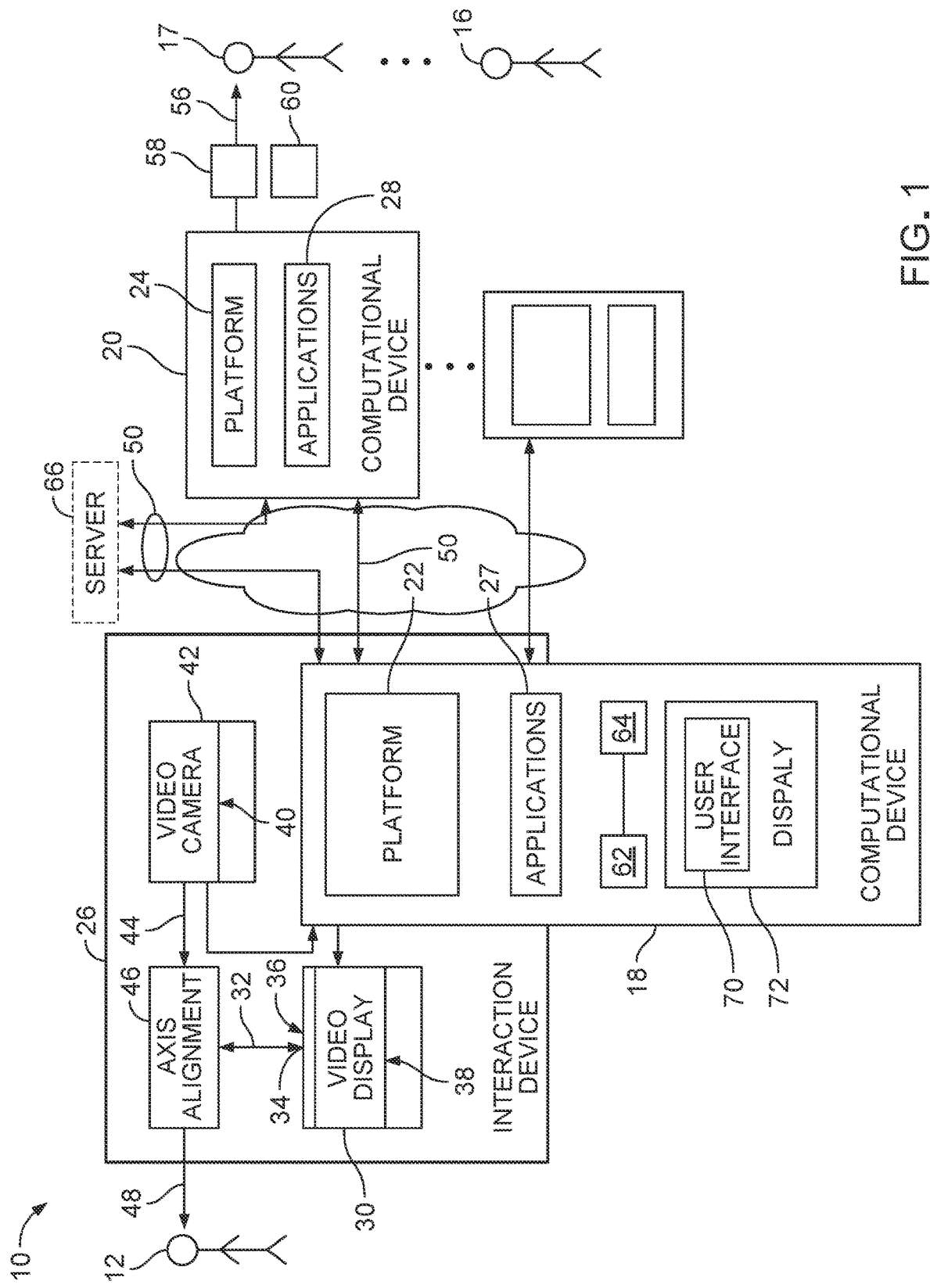

As shown in FIG. 1, here we describe an eye contact video interaction technology 10 (which we sometimes call simply the "technology") enabling virtual eye-to-eye contact during video interaction among two or more participants 12, 14, 16 that is natural, comfortable, intuitive, effective, inexpensive, and simple to use. The technology can enable projected eye contact, perceived eye contact, and simultaneous perceived eye contact and projected eye contact for a participant in a video interaction, and if both participants are using the technology, can enable virtual eye-to-eye contact between the participants. The technology also can provide other features and functions that enhance, simplify, facilitate, expedite, enrich, and improve the experience of one or more participants in video interactions.

We use the terms "virtual eye-to-eye contact" and "eye-to-eye video interaction" broadly to include, for example, virtual projection of eye contact and virtual perception of eye contact, either each alone or both simultaneously. Virtual eye-to-eye contact can occur in a video interaction and generally does not occur in a live face-to-face interaction.

The technology is applicable to a broad range of video interaction contexts including meetings, video calls, conferences, webinars, medical appointments, parties, social gatherings, classes, podcasts, lectures, seminars, board meetings, discussion groups, and combinations of them, and a wide variety of other video interaction contexts some of which are discussed below. The technology is particularly useful and effective in video interaction contexts sometimes known as video conferences.

We use the terms "eye-to-eye video interaction" and "eye contact video interaction" broadly to include, for example, any electronic communication, conversation, or other exchange between two or more participants that can include virtual projection of eye contact, virtual perception of eye contact, or virtual eye-to-eye contact between the eyes of one of the participants and the eyes of another of the participants through the medium of video.

We use the term "participant" broadly to include, for example, any person or people who are engaged on either end of a video interaction. Two or more people who are at on opposite ends of the video interaction are sometimes referred to as "local participants" and "remote participants". As explained below, local participants and remote participants may be very near to one another including in the same room or space. We sometimes refer to a participant as a "local participant" with reference to components of the technology that are the main focus of a particular discussion.

The eye contact video interaction technology includes or is supplemented by one or more computational devices 18, 20 hosting one or more commercially available or proprietary application-based or Web-based video interaction platforms 22, 24 (such as a video conferencing platform). The video interaction platform can enable a participant to engage in a video interaction and to control, among other things, the progress and state of the video interaction, the view being presented, the sharing of the participant's desktop, the inviting of participants, the muting and unmuting of a microphone, and a variety of other functions and features including but not limited to functions and features commonly used during a video interaction on the Internet. In addition, the technology enables the participant to engage in other activities and use other applications 27, 28 on the computational device while distinguishing those activities in her mind from the eye contact video interaction.

We use the term "computational device" broadly to include, for example, any apparatus that includes a processor capable of executing instructions to perform processes or tasks or provide features or functions. Computational devices include computers, workstations, laptops, tablets, telephones, mobile phones, voice assistants, and mobile devices, and a wide variety of other examples.

We use the term "video interaction platform" broadly to include, for example, any software, application, Web-based application, or other facility that hosts, presents, controls, facilitates, cooperates in, or manages one or more video interactions through a communication channel between participants. In some examples, a video interaction platform can acquire and process video captured by a video camera, generate and feed video display information to a video display, present, manage, and interact with a participant interface to control the state, configuration, and operation of a video interaction, and perform a variety of other functions associated with providing video interactions for participants. Examples of video interaction platforms could provide video conferencing, security, marketing, informational, recreational, and a variety of other functions.

In some implementations, the computational device is permanently or temporarily incorporated into a stand-alone self-contained integrated eye contact interaction device 26. In some examples, the computational device is a stand-alone self-contained device (such as a laptop or a mobile phone or other mobile device) to which the eye contact interaction device is coupled. Other cooperative arrangements between the eye contact interaction device and the computational device are also possible.

In some cases, the computational device receives and processes a video capture signal received from the video camera and generates a video display signal for delivery to the video display. The video interaction platform hosted by the computational device can manage the processing and use of the video capture signal and the video display signal to serve features and functions involved in eye contact video interaction.

We use the term "video camera" broadly to include, for example, any device capable of capturing a series of images or frames of a subject at a rate that is, for example, high enough to achieve for a viewer of the sequence an impression of eye contact including eye-to-eye contact with a person captured in the images or frames. Examples of video cameras can include digital cameras, smart phone cameras, Web cameras, cameras of mobile devices, and a variety of other devices.

We use the term "video display" broadly to include, for example, any device capable of presenting a series of images or frames of a subject at a rate that is, for example, high enough to achieve for a viewer of the sequence an impression of eye-to-eye contact with a person included in the presentation. Examples of video displays include CRT displays, flat panel displays, digital projectors, and others.

Overview of Implementations and Uses

As also shown in FIG. 1, in some implementations, the eye contact interaction device 26 contains a video display 30 that has a display axis 32 normal to a position 34 (e.g., at the centre) on a display surface 36 of the video display.

We sometimes use the term "display axis" to refer to an imaginary line extending from a position (e.g., at the centre) of a video display and normal to a plane of the images or frames being presented.

The eye contact interaction device includes a location 38 at which the video display is supported (for example, held in a fixed or adjustable position and orientation) and a location 40 at which a video camera 42 is supported (for example, held in a fixed or adjustable position and orientation). The video camera has a video capture axis 44 along which video of a participant 12 is captured.

The eye contact interaction device includes an axis-alignment device 46. The axis-alignment device, the locations 38 and 40, and the orientations at which the video camera and the video display are held at those locations are arranged so that the display axis and the video-capture axis are directed to the axis-alignment device, which then aligns them in parallel and (in some implementations) on a common line (also called a common axis) 48. The alignment of the axes has the effect of enabling eye-to-eye video interaction (including projection of eye contact and perception of eye contact individually or simultaneously) between a user of the eye contact interaction device (who is both viewing the display (perceiving eye contact) and being captured by the video camera (projecting eye contact)) and another participant using a computer, laptop, mobile phone, other mobile device, or another eye contact interaction device that is connected to the local eye contact interaction device through a communication channel 50 (e.g., through the Internet 51). The local participant 12 (the person using the local eye contact interaction device) will have the advantage of the eye-to-eye video interaction assuming that the remote participant 14, 16 is looking along the video-capture axis 56 of a remote video camera 58, for example, if the remote participant is also using an eye contact interaction device of the kind discussed here. In such cases, the remote participant will have an eye-to-eye contact view of the video of the local participant being presented on the remote video display 60.

We sometimes use the term "video-capture axis" to refer to an imaginary line extending along the centre of the field of view of a video camera from and normal to the plane of an image sensor of the video camera.

In some implementations, the local participant can simply attend to the natural action of looking at (e.g., projecting eye contact to) the subject matter of the eye contact video interaction (which could be any kind of visible subject matter including video of the remote participant) as implied by the axis-alignment from the video display along the common line toward the local participant. The local participant then will automatically be captured by the video camera looking directly at the video camera (e.g., projecting eye contact). As a result, the remote participant will perceive the local participant as looking directly at her (e.g., perceive eye contact).

In some instances, if the local participant is presenting educational information or is communicating with a large number of remote participants, for example, the local eye contact interaction device will provide eye contact video interaction with each of the remote participants in the sense that the local participant can project eye contact and each of the remote participants will perceive the local participant as looking directly into his or her eyes (e.g., will perceive eye contact). In addition, the local participant will understand that he is being seen that way by the remote participants (in other words that his projection of eye contact is being perceived as eye contact) and can proceed comfortably, intuitively, and effectively with his presentation, because he will understand that the remote participants all are seeing him looking directly in their eyes. When the number of participants is relatively small, say fewer than 50 or fewer than 25 or fewer than 5, or simply one local participant and one remote participant it can be useful to enable full two-directional eye-to-eye video interaction by providing an eye contact interaction device to all remote participants also.

In some implementations, the computational device has a processor 62 and storage 64 for, among other things, instructions executable by the processor. In some implementations, the computational device (by using the instructions) executes one or more video interaction platforms as applications or through browser pages. In some implementations, the local video interaction platform operates through a server 66 to communicate with a remote video interaction platform 24 (which may or may not be of the same kind as the local video interaction platform) to effect an eye contact video interaction between the local participant and the remote participant. For that purpose, the local video interaction platform also, among other things, can present a user interface 70 on a display 72 of the computational device, drive the video display to present information and video received through a communication channel 50 from the remote video interaction platform, and receive video from the video camera 42, process it, and send at least some of it through the communication channel to the remote video interaction platform. The computational device is connected to the video display and the video camera by cables or wireless channels that conform to standard input and output communication protocols such as HDMI, USB, or others.

The eye contact interaction device can typically sit on a desk, beside a main computer, at a comfortable height to facilitate relaxed, eye-to-eye communication. For this purpose, it can include a stand and a base as discussed later.

The local video interaction platform can include and operate not only through the computational device 18 but also through one or more other computational devices. Two or more of such computational devices can cooperate in providing features and functions of the technology and other features and functions. For example, a smart phone could serve as a second computational device that cooperates with computational device 18 to enable interaction by the participant with the technology. One or more user interfaces could be presented on any combination of one or more of the computational devices.

Although the discussion to this point has emphasized the parts of the technology that involve video and visual perception and expression, the technology can include interaction modes, devices, and software associated with other types of perception or expression or combinations of them. For example, the eye contact video interaction can be associated with or accompanied by sensory expression or perception implemented by touch sensors or haptics, audio expression or perception through microphones or speakers, gestural expression, and others.

Through the user interface 70, the local participant can launch the local video interaction platform, login, control settings for its operation, view real-time video of the remote participants, and perform a variety of other tasks.

One or more of the computational devices also can launch and execute other programs, present user interfaces to the local participant, and interact with the local participant with respect to the other programs, in a typical or atypical way.

In various examples, the proportions of total time spanned by an eye contact video interaction session during which a participant is engaging in direct eye-to-eye contact (including projecting eye contact or perceiving eye contact) or is engaging in other activities through the user interface of the computational device or other component of the technology can vary as can the lengths of continuous periods of eye-to-eye contact depending on the video interaction context, the progress and state of a video interaction, the states and preferences of the participants, and other factors. In some cases, the local participant can use the eye contact interaction device for periods (sometimes extended periods) of traditional eye-to-eye contact (including projection of eye contact or perception of eye contact) interleaved with occasional brief traditional uses of the computational device to control and interact with the eye-to-eye interaction platform and with other applications and Web-based facilities.

Features and combinations of features of the eye contact interaction technology can be implemented in a broad range of methods, devices, software, and systems, some of which are described below as example configurations.

EXAMPLE CONFIGURATIONS

Figure 2:
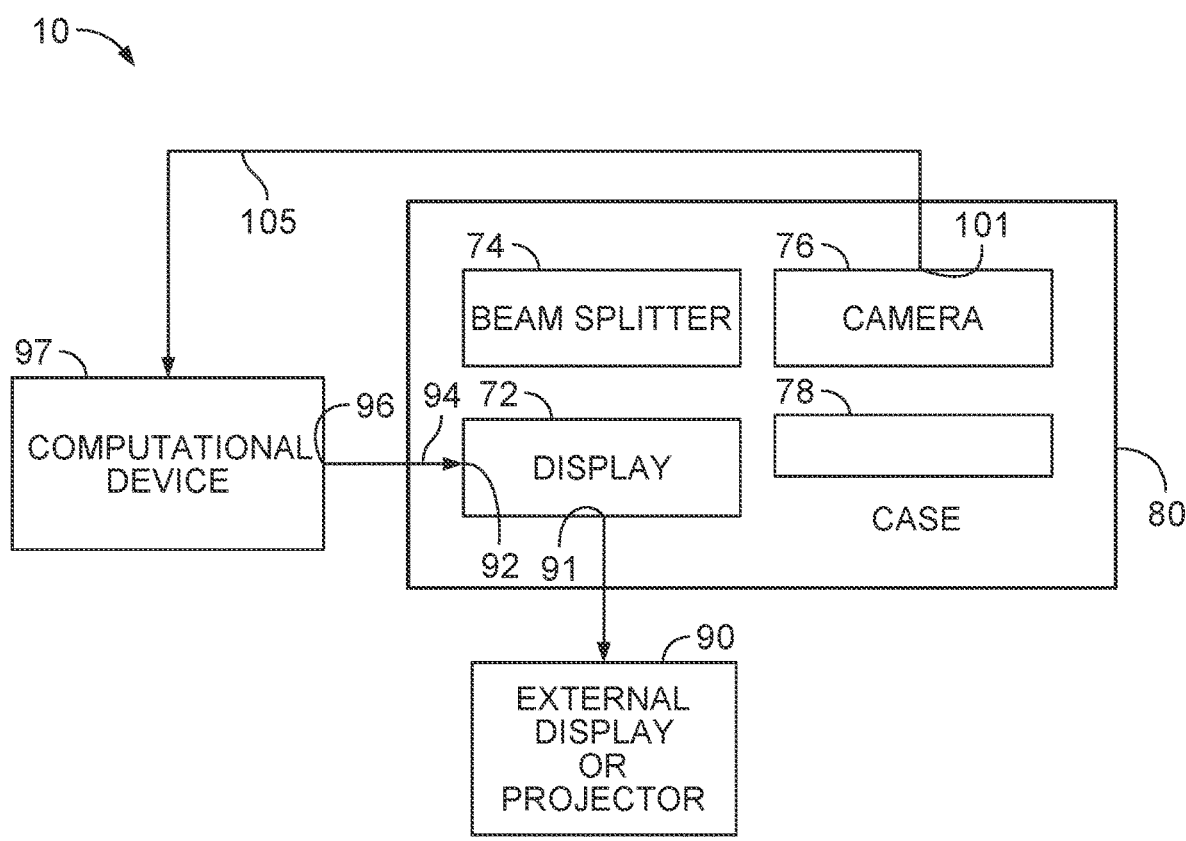

Configuration A—Integrated Eye Contact Interaction Device without a Computational Device As shown in FIG. 2, in some implementations, the eye self-contained (except for the computational device 97) and includes an integrated video display 72, an integrated beam-splitter 74, an integrated video camera 76 or a location 78 to receive an added video camera device, and a case 80 to contain the display, beam-splitter, video camera, and in some instances other components.

Video Display

In some cases, the integrated video display is a high-resolution, appropriately-sized flat-screen display. The image quality of the video presented on the video display is an important factor in the quality, realism, and effectiveness of the eye contact video interaction. Features of the video display that improve the video rendering, including its clarity, colour rendition, sharpness, resolution, brightness, contrast, colour temperature, saturation, and combinations of them and others, are useful. One objective is to provide a video interaction that the participant perceives to be as life-like and realistic as possible. As a result, the video presentation will not interfere consciously or subconsciously with the participant's natural and comfortable eye contact video interaction with other participants (including virtual projection of eye contact and virtual perception of eye contact). The participant's confidence in the realism and naturalness of the eye contact video interaction can enhance the quality of the participant's experience and the effectiveness of the interaction as perceived by both the participant and other participants.

The integrated display can have a variety of possible characteristics including, in some examples, the following.

1. Size. The diagonal dimension of the display surface should not be too large in order that the video interaction device not take up an unnecessarily large amount of table or desk area. Conversely a dimension that is too small will compromise the realistic life-like impression conveyed to the participant. Good sizes may be in the range of 6 inches to 10 inches; a particularly good size is about 7 inches diagonally across the display surface.

2. Resolution. In some examples, the resolution of the integrated display can be high, at least 1080p or 4K, as the integrated display will be the primary focus of the participant's attention during a video interaction. The display of the computational device need not have as high a resolution if it is used only infrequently, for example, to control the integrated display, screen share, review emails, or perform other tasks.

3. Brightness and colour rendition. The integrated display should be bright enough to produce a realistic life-like presentation because in some cases the participant will be viewing a reflection of the video in a beam splitter. In some implementations, the integrated display could have a brightness in the range of 250 to 1000 cd/m2. In one particular example, the brightness is 500 cd/m2, the contrast is 1000:1, and the viewing angle is 1700/1700 (H/V). The integrated display should be able to render a colour correct video.

4. High definition video output. In some cases, the video display can include an HDMI or other high definition video output 91 for connection to an external video display 90 (for example a larger video display) or to a projector to project the video interaction onto a wall for a larger audience. Such a connection will enable the video to be "mirrored" from the integrated video display to the external video display.

In some cases, the integrated video display can be a display of the kind used as a monitor accessory for a video camera or other digital camera and can have features capable of rendering high quality video. One commercially available example is the Lilliput A7S 7 Inch On Camera Field Monitor. This monitor supports a 4K HDMI input loop output, has a 1920×1200 resolution, a 1000:1 contrast ratio, a 500 cd/m² Brightness, and a 170-degree viewing angle, and is available from Amazon at https://www.amazon.com.au/Lilliput-Monitor-Supports-1920×1200-Resolution/dp/B074X9JTRC/ref=asc_df_B074X9JTRC/?tag=googleshopdsk-22&linkCode=df0&hvadid=341791754774&hvpos=&hvnetw=g&hvrand=132715747329890240752&hvpone=&hvptwo=&hvqmt=&hvdev=c&hvdvcmdl=&hvlocint=&hvlocphy=9070562&hvtargid=pla-569851224162&psc=1.

The video input to the integrated display, for example, the Lilliput display identified above, can be an HDMI signal carried to an input 92 of the integrated video display over an HDMI cable 94 from the HDMI output 96 of a computational device 97 that may be generating the video for display. If the computational device does not have an HDMI output, the connection can be through a USBC-HDMI adaptor or cable or can be made in other ways.

Power for the display can be provided by a plug pack (power adaptor) that supplies approximately 12 volts DC at 1 amp, for example, the Altronics plug pack (https://www.altronics.com.au/power-supplies/power-packs/?type_1=ac-to-dc-power-adapters) available from Amazon.

A variety of other integrated displays from Lilliput and other vendors may also be suitable.

Among others, one of more of the following features (which can be preassigned to buttons on the front) of the integrated video display (or another location) are useful for good eye contact video interaction.

1. A selectable (on-off) target (for example, a red cross) to mark the centre of screen for the participant. The marked centre of the screen can be considered an end point of the display axis mentioned above so that when a participant is looking directly along the display axis toward the red cross, the participant is necessarily being video captured by the video camera with her eyes directed along the video capture axis.

2. Ability to horizontally flip the displayed material on the screen to make text readable that has been left-to-right by reflection in the beam-splitter mirror.

3. Adjustable brightness and contrast.

4. Selectable aspect ratio and zoom functions.

The size and configuration of the eye contact interaction device may depend largely on the size and aspect ratio of the beam splitter.

Axis-Alignment Device (e.g., Beam-Splitter)

In implementations that use a planar glass beam splitter, the type incorporated in teleprompters and having a 70/30 ratio of light transmission (to the video camera) to reflection (from the integrated video display) can be used. The glass thickness should be chosen to be thick enough for rigidity and not so thick as to be unnecessarily heavy. An example of a glass beam splitter that would be suitable is the type contained in the teleprompter kit available from Leederville camera (cut to size) https://www.leedervillecameras.com.au/products/accessories/studio-equipment/prompt-it-maxi-teleprompter-kit.

Suitable glass in large sheets is also available at lower cost per finished unit from suppliers in the US https://teleprompter-mirror.com/glass-teleprompter-mirror/ and China https://www.alibaba.com/product-detail/Wholesale-Price-2 mm-3 mm-3-2mm_62345959902.html.

The Video Camera

A broad range of video cameras can be used from a simple imaging sensor held in a simple container and mounted directly on the case of the eye contact interaction device, to a full frame professional digital camera with an HDMI output (such as the Sony Alpha 7) held on a supporting frame of the eye contact interaction device. Video cameras having high level features and functions and high-quality image generation parameters can provide better quality video and may be more suitable. High quality video has benefits including a potentially better experience for the remote participant (if the remote participant has a display that can take advantage of the video quality). Implicitly the local participant can also have a better experience and perform more effectively in the eye contact video interaction by knowing that the quality of the video being captured locally and presented remotely is high.

Less expensive video cameras may also be suitable, such as popular mirrorless cameras using an APS-C sized sensor (examples are the Sony a51000 & a6000 and the Canon M200, a relatively low cost 4k camera).

In some examples the video camera can be a webcam that is simpler to connect and does not require a separate power supply or interface device. The video signal produced by some webcams is of a high quality, for example, the Logitech StreamCam https://www.logitech.com/en-us/product/streamcam, which can output a video signal at 1080p and 60 fps and requires only a single USB-C connection to a computational device.

The video camera can include an HDMI or other protocol output 101 to provide a video signal to the computational device.

Communication Interface for the Video Camera

A video camera typically will produce and deliver (at a physical or wireless output) an electronic video signal conforming to a common communication protocol. The computational device typically can accept (at a physical or wireless input) and use video signals conforming to one or more common communication protocols. The video camera must be connected to the computational device by an interface 105 that can carry the video signals and in some cases perform protocol conversion from the output protocol used by the video camera to the input protocol used by the computational device, for example, a USB or Thunderbolt protocol. In some examples, the interface is a cable that connects an HDMI output to an HDMI input.

In some implementations, the interface enables the HDMI output of the video camera to be captured by a computational device. The Elgato Camlink https://www.elgato.com/en/gaming/cam-link-4k is one example of such an interface having an HDMI input and a USB output for connection to a computational device. Another example is the Razor Ripsaw available from Amazon at https://www.amazon.com.au/Razer-Ripsaw-Professional-Grade-Mix-Playstation/dp/B01CVOMZDM. The Razor Ripsaw has an HDMI input and a USB output for connection to the computational device. In addition to a video signal carrying interface, a video camera may need to be connected to an external power supply 98.

The Case

A variety of designs are possible for the case. Among the design considerations are the following.

1. When they are included in the eye contact interaction device, the case can hold the video camera, the video display, and the beam splitter securely in the correct locations, orientations, and distances so that the alignment of the video capture axis and the video display axis can be established and maintained.

2. The case should be constructed to include walls or other features to provide appropriate shielding against ambient light reaching the lens of the video camera, the surface of the video display, and the surfaces of the beam splitter. Otherwise the quality of the displayed video or of the captured video or both can be compromised.

3. Keeping the case as lightweight as possible consistent with sufficient strength is desirable as the eye contact interaction device housed in the case may be moved frequently.

Figure 3:
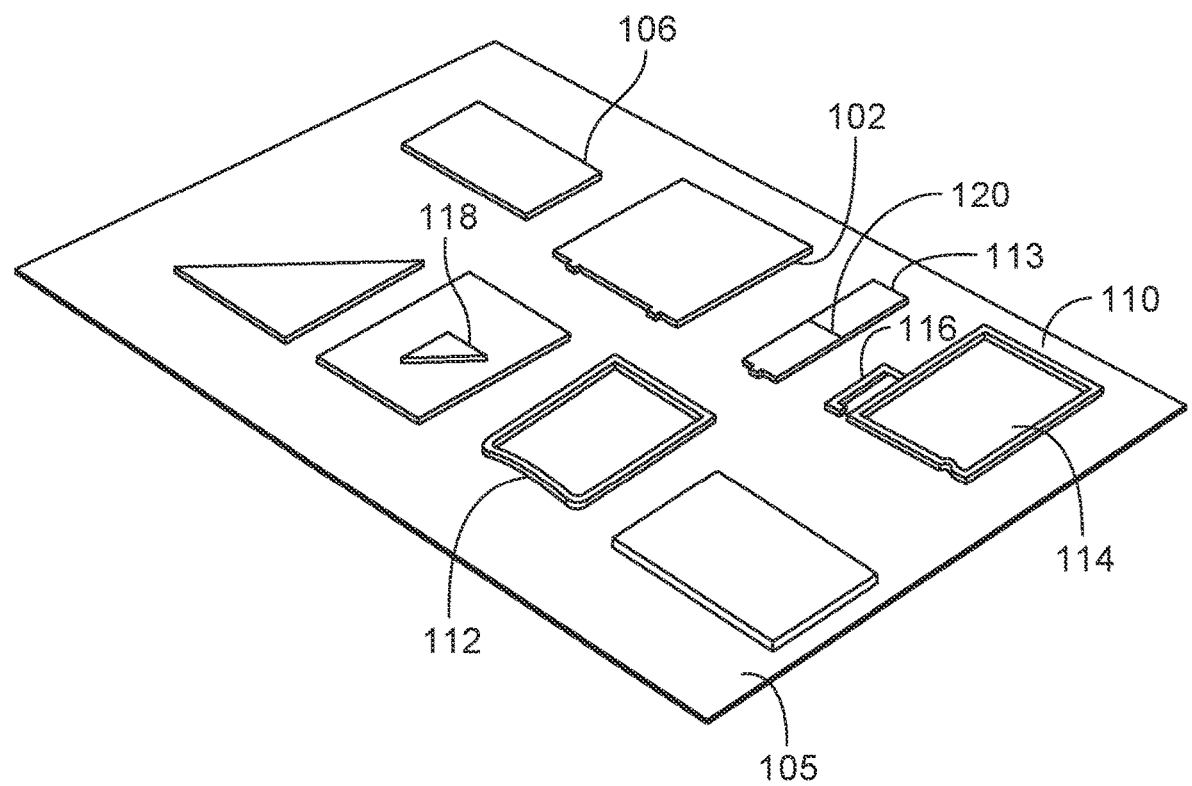
FIGS. 3 and 4 are perspective views of a work piece and an assembled case for an interaction device.
Figure 4:
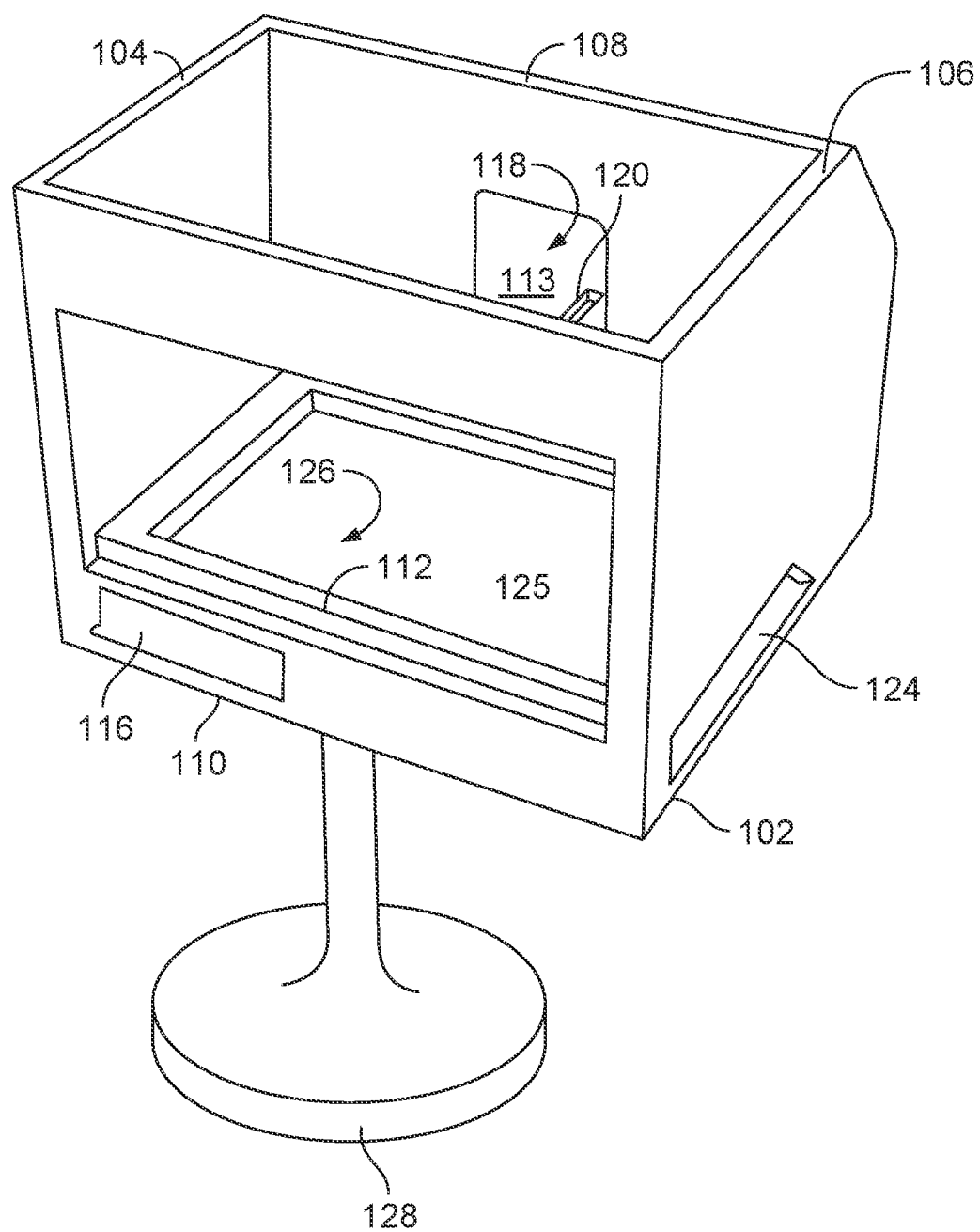

As shown in FIGS. 3 and 4, in some implementations, the case is constructed using eight pieces that can be 3D-printed or cut from a single sheet of material using a computer numerical control (CNC) router. The 3D printer or the CNC router can be controlled using a file generated by a CCAD/CAM program such as Fusion 360 available from AutoCad based on the design of the case. In some instances, the case could be made of other materials, such as bamboo, to make it significantly lighter weight which, among other things, could enable it to be mounted on a more compact, smaller support (discussed later), such as those intended for supporting mobile devices.

The eight pieces used to construct the case include a bottom 102, a left side 104, a right side 106 (shown upside down), a top 105, a back 108, a front 110, a frame 112 for the video display, and a support 113 for the video camera. At least some of the pieces includes tabs and slots that match and can be fastened by adhesive, for example, to form the finished case.

The front 110 includes a rectangular opening 114 large enough to permit a participant looking through the opening to view the entire display reflected in the beam splitter. A smaller rectangular opening 116 in the front, below the viewing opening, is used for access to the buttons or other interface elements that control the settings of the integrated video display. The back piece 108 has a rectangular opening 118 to accommodate the lens-end of a video camera. The video camera support 113 provides a horizontal surface on which the video camera can rest with its video capture axis extending to and through the centre of the beam splitter toward the eyes of the participant when the participant is looking at, for example, the centre of the reflected surface of the video display.

In some examples, the lens of the video camera projects through the rectangular opening of the back piece 108. In some cases the lens is behind and does not project through the rectangular opening. A slot 120 in the video camera support accommodates a bolt or other fastener that can mate with a socket or other mating feature on the bottom of the video camera, to hold the video camera securely in place. For example, a webcam could be mounted using a typical ¼ inch threaded camera bolt such as the one available from Carbatec: https://www.carbatec.com.au/149pce-knob-jig-pack-1-4.

The rectangular opening 118 and the video camera support with the slot 120 are configured to permit use of a wide variety of video cameras of different sizes, shapes, weights, types, and configurations. Because smart phones, for example, differ in shape and structure from digital video cameras, it is envisaged that the case could be adapted to allow different video cameras and smart phones to be mounted with the lens having the proper orientation and position. An adjustable element or a modular component of the case can serve this purpose.

Each of the left side and right side of the case has a 45-degree slot 122 to receive one of the opposite sides of the beam splitter as the case is assembled. (The 45-degree slot is visible for only one of the sides.) In some implementations, the beam splitter slots could be at other than a 45-degree angle with corresponding adjustments in the orientation of the display relative to the beam splitter. One of the left side or right side has a rectangular slot 124 used for access to the HDMI input and DC power input of the integrated video display The display frame 112 includes a rectangular window 125 at least as large as the display surface of the video display. The frame and the bottom of the case define a chamber 126 to contain the video display with the display surface facing up toward the beam splitter.

Among other things, the top helps to prevent ambient light reflection on the surface of the beam splitter facing the video camera.

In some implementations, the eight pieces are formed by CNC routing from a single 900 mm by 600 mm sheet of premium AA hardwood plywood, but an acrylic sheet or other material or combinations of them could be used. In some cases, the pieces or combinations of them, or almost the entire case could be injection moulded in a variety of different forms and shapes.

As described in more detail later, in some implementations the video display is attached by a hinge or other mechanism to the beam splitter which allows the video display to be pivoted or otherwise moved and closed against the beam splitter. When closed, the video display can be held in place against the beam splitter mechanically or using magnets to shield the beam splitter and the video camera behind it. In some cases inbuilt LEDS or other lights can be mounted to extend from the bottom surface of the case and can be illuminated when closed. This arrangement provides a second mode in which the eye contact interaction device can act as a desktop lamp, for example.

As shown in FIG. 4, a three-dimensional rendering of the finished case without the top illustrates the interior and how the beam-splitter glass is retained in the grooves formed in the side panels.

The Support

In typical uses, the case can be mounted or held in a position and orientation that aligns the common axis shared by the video capture axis and the display axis with the axis of the participant's gaze. To facilitate such a position and orientation taking account of the participant's position and orientation and the direction in which she is facing, a support 128 can be provided.

In some implementations, the support is incorporated in or integral to the case. In some examples, the support is separate from and connected to the case. The connection can be permanent or temporary so that the support can be repeatedly connected to and removed from the case. In some instances, the support can be a tripod, for example, a desktop tripod. In some instances, a ¼" adaptor to receive a typical ¼" camera mounting bolt can be included in the base of the case for attachment to the tripod. A variety of tripods could be used, such as a NEEWER tripod available from Amazon at https://www.amazon.com.au/Neewer-Centimeters-Portable-Camcorder-kilograms/dp/B01MSAEZN8 or tripods available from Leederville Camera at https://www.google- .com/shopping/product/14759902322478587975?prds=oid:
93588880701997 2978&hl=en&lsf=seller:10160362,store:
2291968430623775521,s:h.

A wide variety of other kinds of supports could be used to hold the case in a suitable position and orientation relative to a desk, table, or floor.

The case described above, and other implementations of the eye contact interaction device, provide flexible and adaptable features for supporting video cameras and video displays and other components. Therefore, a wide variety of other configurations are possible including the following configurations.

Figure 5:
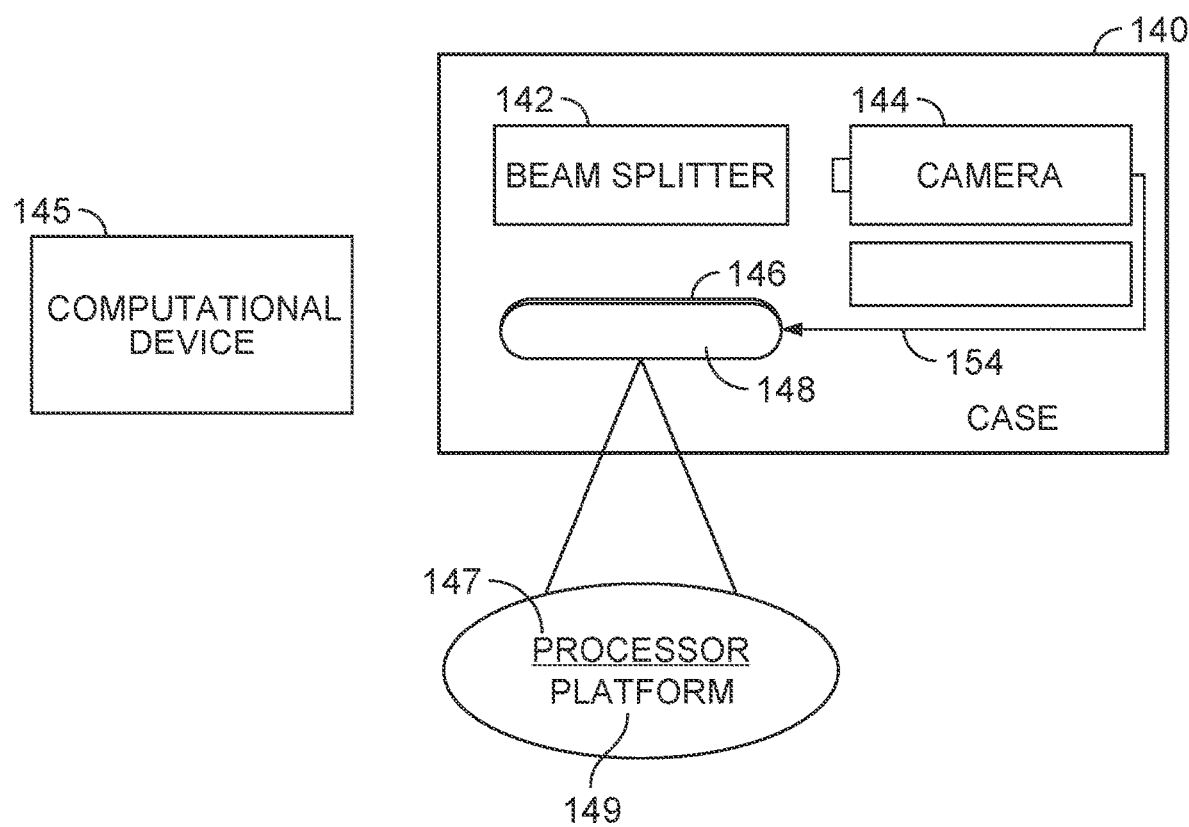

Configuration B—Substituting a Mobile Device Display for the Integrated Video Display As shown in FIG. 5, this configuration, like configuration A, uses a case 140, a beam splitter 142, and an external video camera 144 mounted on the support with its lens facing the back of the beam splitter. An independent computational device 145 separate from the case can be used by a participant for purposes other than maintaining an interaction session. The display 146 of a mobile phone or other mobile device 148 serves as the video display and includes the processor 147 that executes the video interaction platform 149 either as an application running on the mobile device or as an application served through a Web browser.

In this configuration, the local participant uses the mobile device to set up and initiate an interaction session with one or more remote participants. Once the session has been set up, the local participant places the mobile device into the bottom chamber of the case 140 with its display 146 facing up. In this configuration, the mobile device display replaces the integrated video display described earlier. The external video camera would continue to serve as the video camera and, for this purpose, could be connected to the mobile device by a cable or adaptor 154 (such as a cable having one end adapted for an Apple Lightning connector on an iPhone and the other end adapted for a USB connector on the video camera). In some cases, an additional application could be installed on the mobile device to substitute the external video camera for the internal camera of the mobile device.

In effect, this configuration would enable physically and conceptually decoupling the video camera being used for the video interaction from the video display of the mobile device to permit the display axis of the mobile display device and the video capture axis of the integrated video camera to be aligned on the common axis using the beam splitter.

In this configuration, the local participant could view whatever was being presented on the display of the mobile device. The presentation could include a video of one or more remote participants, controls for the video interaction platform, and possibly windows of other applications. To control and interact with the touch-sensitive surface of the mobile device, the local participant could remove the mobile device from the case or could touch the surface through the window of the case frame lying above it.

Figure 6:
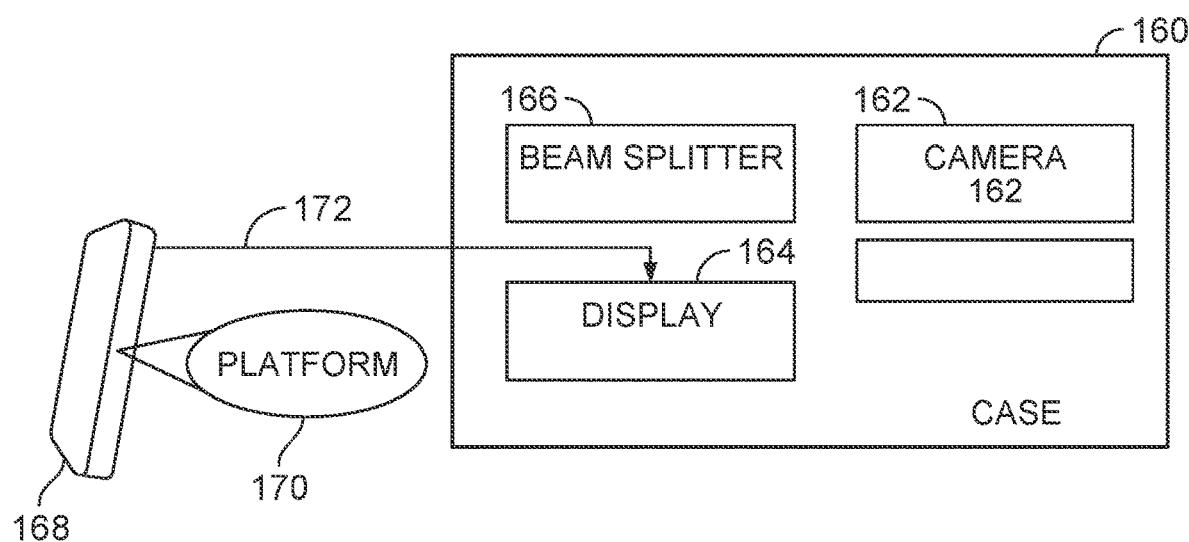
Figure 13:
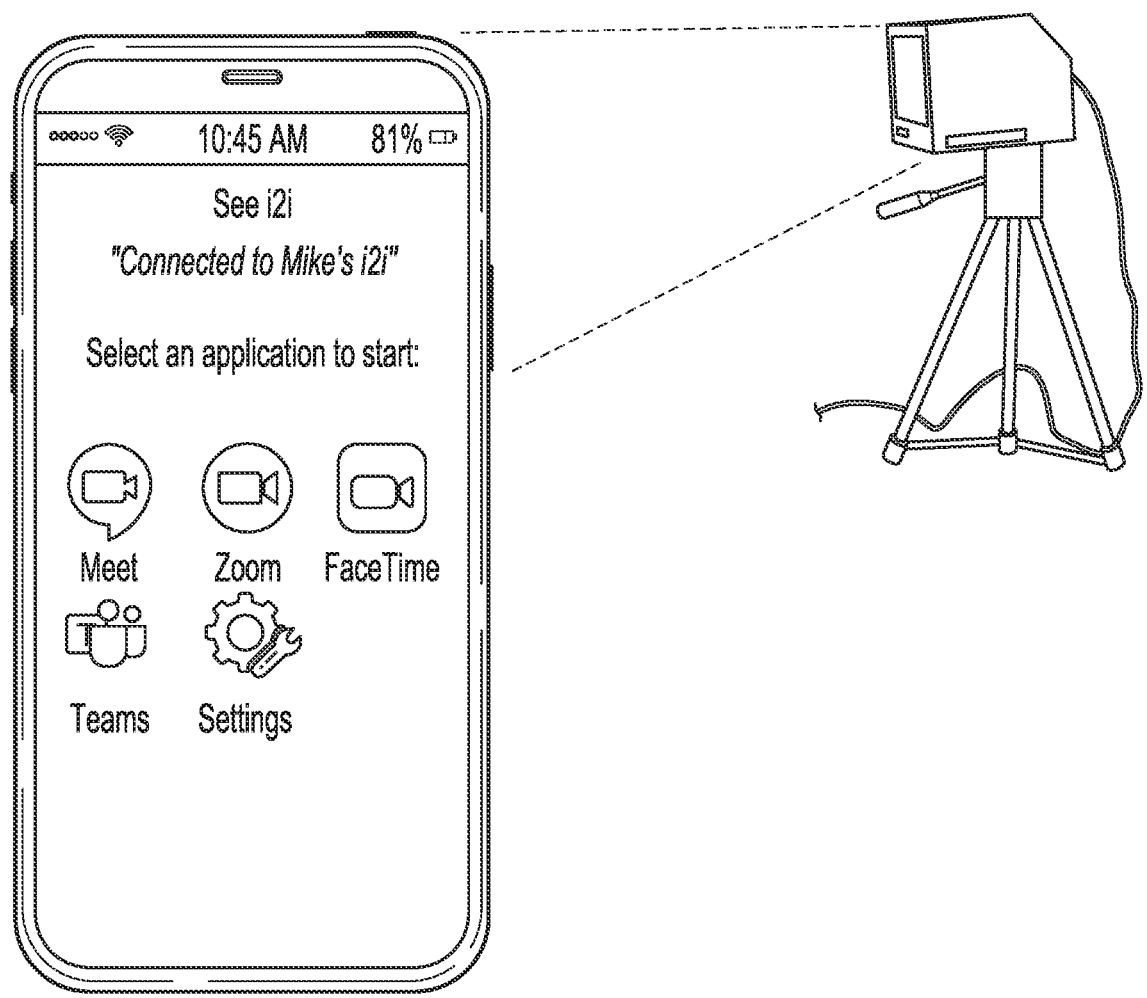

Configuration C—Mirroring a Separate Mobile Device Video Display to the Video Display in the Case In some implementations, as shown in FIG. 6, a configuration can include the case 160, the external video camera 162, the integrated video display 164, and the beam splitter 166 described above. A mobile phone or other mobile device 168 separate from the case can serve as the computational device. The video interaction platform 170 can be executed on the mobile device and enable the local participant to control the eye contact video interaction by touching the surface of the mobile device, for example. (See also FIG. 13.) Although the mobile device is used to initiate the video interaction, the display signal generated by the mobile device for its own embedded display is mirrored to the integrated video display within the case using, for example, a cable or adaptor 172 in which one end could serve an Apple Lightning connector and the other end could serve an HDMI connector of the integrated video display. As in configuration B, an additional application could be installed on the mobile device to substitute the external video camera for the internal camera of the mobile device.

In this configuration C, the mobile device is not placed in the case: interaction by the participant with the surface of the mobile device is therefore less cumbersome than in configuration B.

Figure 7:
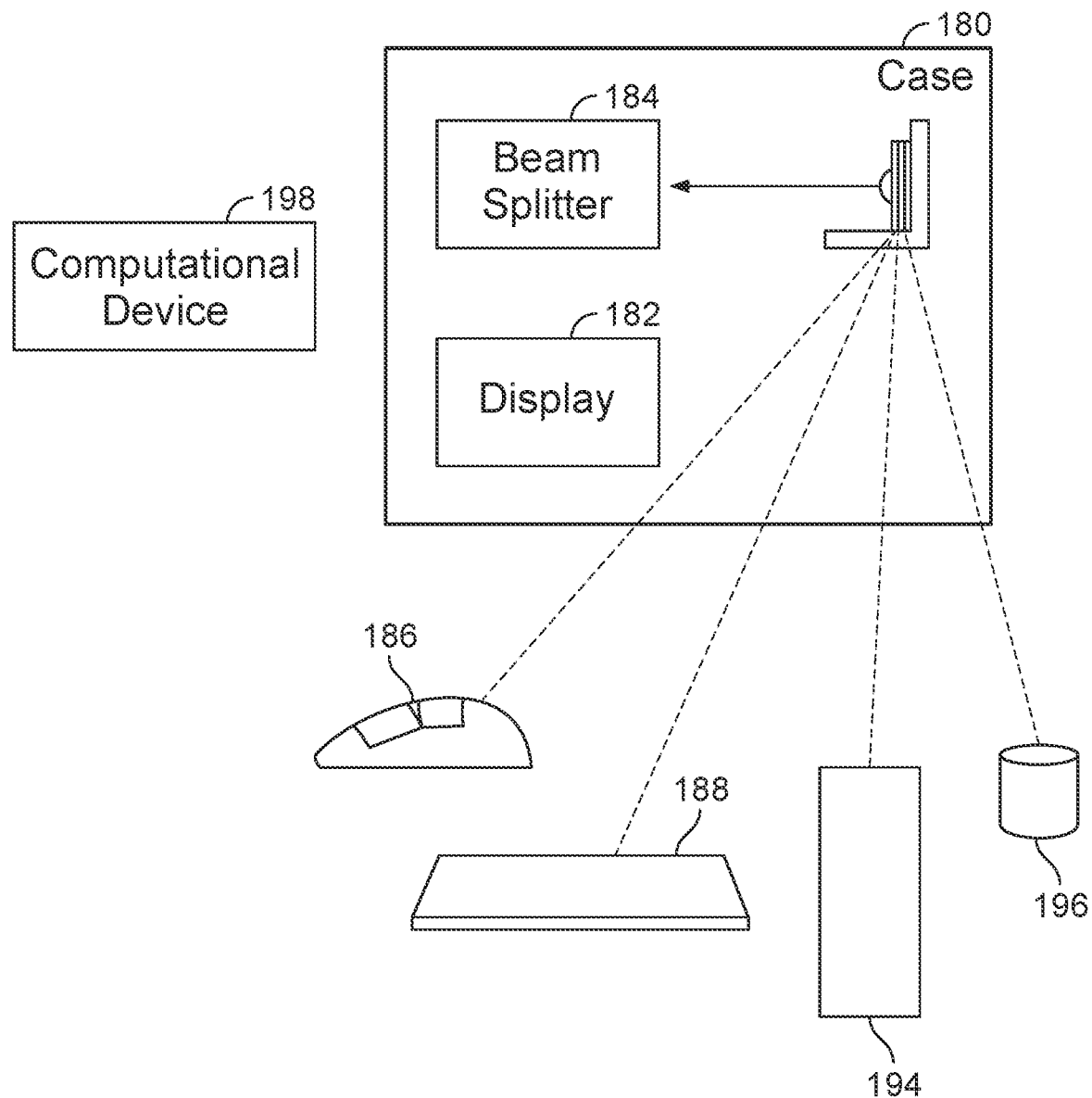

Configuration D—Substitute a Mobile Device Camera for the Video Camera Held in the Case As shown in FIG. 7, in some implementations, the configuration can include the case 180, the integrated video display 182, and the beam splitter 184 as described earlier. In this configuration D, the participant sets up and initiates the interaction session through the video interaction platform and then places the mobile device on the video camera support with the axis of the lens of the camera of the mobile device directed to the centre of the beam splitter and at a 45-degree angle to the surface of the beam splitter. The camera of the mobile device therefore replaces the external video camera described in Configuration A.

In this configuration the video camera support of the case can be designed for easy mounting and demounting of the mobile device and can include adjustable features to enable mounting and demounting a wide variety of mobile devices.

As described earlier, the display signal generated by the mobile device for its own embedded display could be mirrored to the integrated video display within the case using, for example, a cable or adaptor in which one end could serve an Apple Lightning connector and the other end could serve an HDMI connector of the integrated video display. An additional application could be installed on the mobile device to substitute the external video camera for the internal camera of the mobile device.

Because the mobile device is held on the back side of the case, it is not easily accessible for physical control of settings and applications running on it. Control however, may be achieved remotely using, for example, a Bluetooth mouse 186 or keyboard 188 or both, paired with the mobile device.

One or more of the microphones or speakers of the mobile device may also be partially obscured by its location. The audio can be enhanced using a Bluetooth speaker 194 or microphone 196 or both as an alternative to the inbuilt microphone or speaker or both of the mobile device.

Configuration E—Mobile Device Camera Serves as the Camera for a Separate Computational Device This configuration utilises the integrated video display and glass beam splitter described for configuration A. The mobile device is placed on the support at the back of the case and replaces the external video camera as in configuration D. A cable or adaptor (such as a USB adaptor) connects the mobile device to the computational device 198 on which the video interaction platform is running. Additional software running on the computational device (for example, iVCAM https://www.e2esoft.com/ivcam/) can select the camera of the mobile device to be used as an external Webcam relative to the computational device.

Among the advantages of configuration E is that the quality of the video and audio components of a typical mobile device can be high. The configuration E can use the participant's own mobile device to reduce the cost of the technology. Also, because the video interaction platform is running on a separate computational device-either integrated or external-no interaction is required with the screen of the mobile device that may be required when the mobile device is used both as the camera and computational device for the eye contact video interaction.

Figure 8:
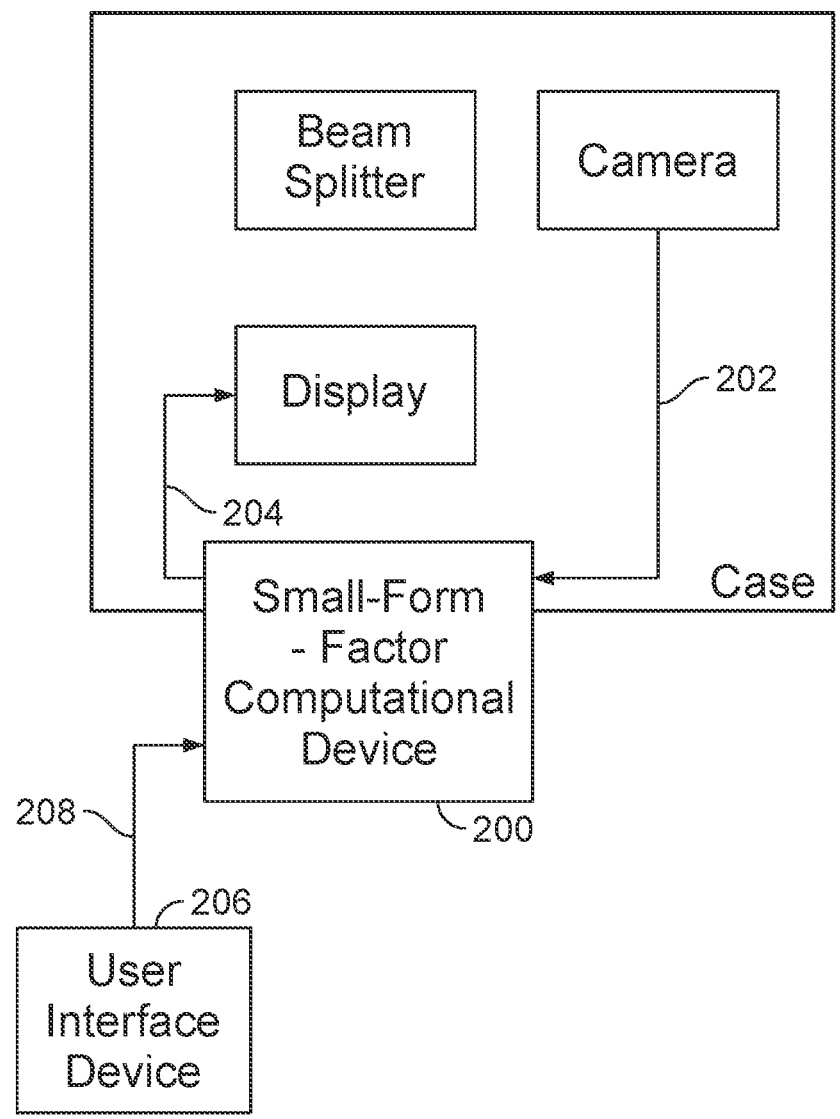

Configuration F—Embedding a Small Form Factor Computational Device in the Case to Yield a Self-Contained Video Interaction Device In some instances, as shown in FIG. 8, this configuration F uses the case, the integrated video display, beam splitter, and external video camera or a camera of a mobile device placed on the support of the case (as described in configuration A and configuration D). A small-form-factor computational device (such as an Intel NUC 200) is integrated with the case by being mounted in or on or near the case. The external video camera or the camera of the mobile device is connected by a cable or adaptor 202 to the integrated small-form-factor computational device. In some cases, the computational device, could be a smartphone, connected wirelessly or through a cable. The integrated video display of the case is connected by a cable or adaptor 204 to the integrated computational device and serves as its display. A user interface device 206, for example, a mouse or a keyboard or both are coupled by a cable or adaptor (such as USB) or by Bluetooth 208 to the integrated computational device to enable control of the computer. The video interaction platform is executed on the integrated computational device.

The combination of interconnected components in this configuration F provides a self-contained, compact, easy-to-use, integrated video interaction device that can provide eye contact video interaction to serve any video interaction platform being executed on the integrated computer.

In some examples, a fully integrated eye contact interaction device could use a small-form-factor computational device having an Intel 10 generation i3 processor with 8 GB RAM and a 250 GB NVME solid state drive. The processor could run Windows 10 and ZOOM video conferencing software, for example. A wireless keyboard and mouse can communicate with the integrated computer https://www.altronics.com.au/p/a0981-2.4ghz-wireless-media-centre-keyboard-with-trackpad/. An application running on the mobile device, such as Mouse Pro running on an iPhone can be used to control the small-form-factor integrated computer (NUC). Effective operation of the ZOOM platform can be achieved using an external video camera as in configuration A or a video camera of a mobile device as in configuration D or configuration E.

Configuration G—Full Featured

This configuration G is designed to include a set of components configured to provide a set of features and functions that together enable an eye contact interaction session (e.g., a virtual meeting) among two or more participants without requiring involvement of any other components.

Figure 14:
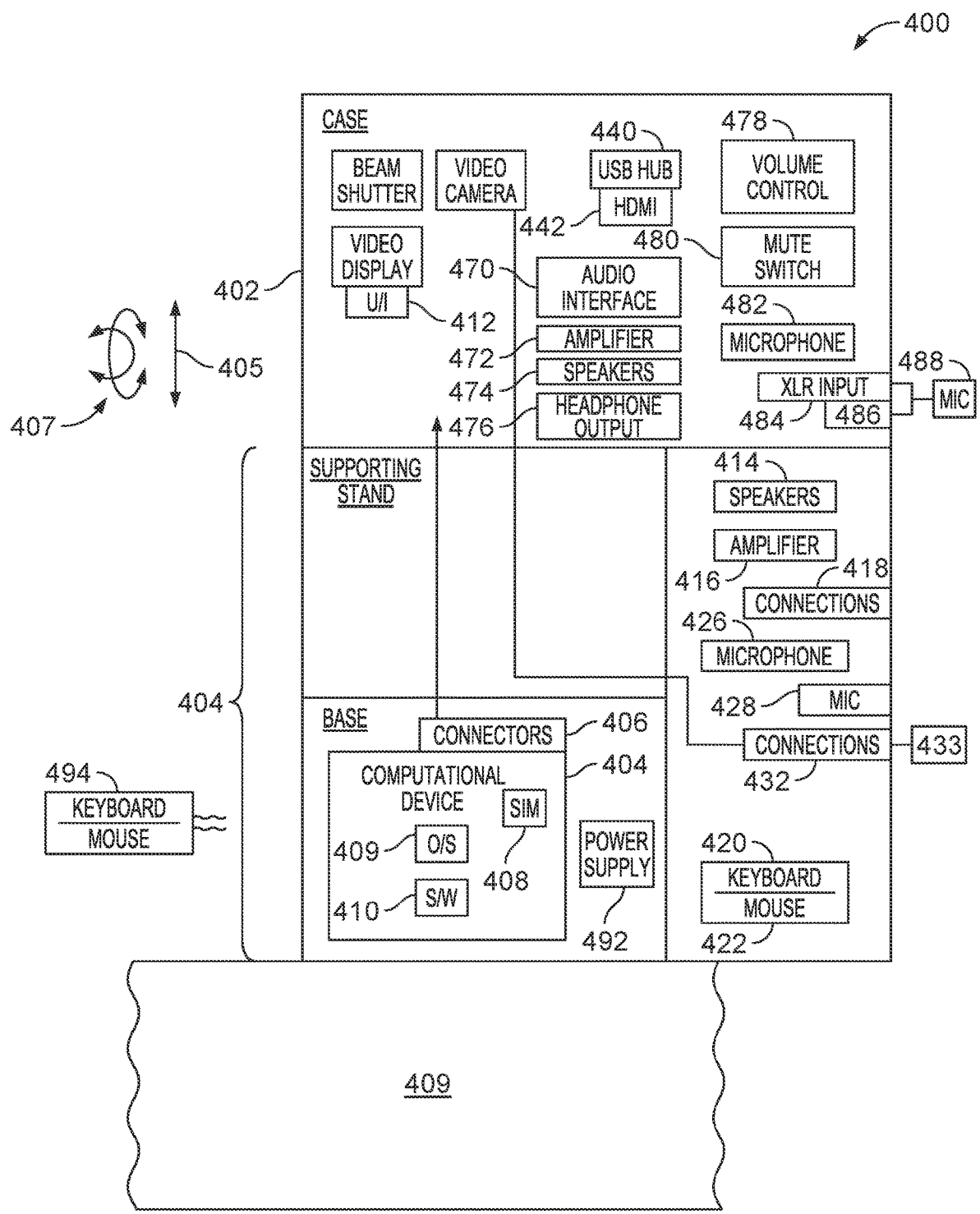

As shown in FIG. 14, in configuration G, the eye contact interaction device 400 can include two main components, (a) a case 402 holding a video camera, a video display, and a beam splitter as previously described for other configurations, and (b) a supporting stand and base 404 for the case to enable the height 405 and orientation 407 (e.g., tilt) of the case to be adjusted relative to a desk or other surface on which the stand and base 409 are placed. In some examples, power, wiring, and other connections with the video display and video camera in the case would run through the stand to a small form-factor computational device 404 and connectors 406 located in the base.

The computational device in the base would have WiFi capability and built-in 4g/5g LTE cellular communication capability based on an incorporated SIM card 408 for independent connection to the Internet. The computational device would include an operating system 409 and software 410 used to initiate, manage, and terminate an eye contact interaction session. The computational device would boot directly to a user interface 412 displayed on the embedded video display that allows the participant to select a video interaction platform (such as SKYPE) to be used for the session, to choose a microphone, speakers, and video display to be used, and to determine whether they are components contained internally within the base or are external components.

The base or stand would also incorporate some or all of the following components: (a) one or more high quality compact speakers 414, (b) a high quality audio amplifier 416 to drive the speakers with amplified sound from the computational device within the base, (c) connections 418 for an external power supply both for the computational device and the video display incorporated into the case, (d) a compact keyboard 420 with a touchpad or mouse connection 422 to control the computational device through the user interface displayed on the video display (the keyboard and mouse 422 can be detachable from the eye contact interaction device and communicate via Bluetooth with the computational device), (e) an integrated high quality microphone 426 within the base or stand and an input 428 for an external microphone, (f) connections 430 (e.g., an HDMI switch) to accept input from an external computational device 432 such that the video display in the case is driven from the external computational device rather than from the integrated computational device within the base, (g) connections 434 to connect the video camera within the case to an external computational device 433 rather than to the integrated computational device within the base (The eye contact interaction device can therefore be used to host a session from its own inbuilt computational device or from an external computational device, and the connections within the base can allow either option.)

As also described later, the construction of the eye contact interaction device could be modular such that the case containing the camera, beam splitter, and video display can be attached to a variety of different stands, such as a full featured stand and base as described above or a simple stand and base that provides support and otherwise has limited functionality beyond the connections required for power, the video camera, the video display, and perhaps the speaker and the audio amplifier. In configuration G, the eye contact interaction device contains a USB-C hub 440 with an HDMI output 442. This allows a single connection from the computational device to receive the inbuilt camera output and transmit the video for the eye contact interaction session from the computational device to the video display for reflection in the beam splitter (with approximately a 70/30 transmission/reflection ratio). The HDMI output of the hub is connected to the inbuilt video display of the device.

The eye contact interaction device includes an HDMI output from which a video signal can be sent to an optional larger video display connected so that other people in the local space can view the remote participants.

The eye contact interaction device can also contain an audio interface 470, an amplifier 472, and speakers 474, as well as an optional headphone output 476.

The volume of the audio portion of the video can be modified by a volume control 478 and the device can also have a hardware mute switch 480 for the microphone 482.

Most audio interfaces are based on a Texas Instruments TI 270x chip as noted in the diagram which this provides similar function to an audio interface such as the Rode A1 USB interface.

A USB microphone such as the Rode NT USB mini can be plugged directly into the integrated USB-C hub but ideally the eye contact interaction device will also have an XLR input 484 with phantom power 486 for alternative microphones 488.

In some implementations, the option of using a standalone computational device is not built into the base of the eye contact interaction device, to simplify the construction and design and reduce the cost.

In some examples, the base can have a recess for the optional internal Intel NUC or other small form-factor computational device; the input of the integrated USB-C hub can then be connected to the internal small form-factor computational device instead of the external computational device. In such cases, the video signal can be directed to the internal computational device and fed from the internal computational device through the hub to the video display. In some implementations, the NUC or other small form-factor computational device can be installed within a separate custom add-on base component. The separate base component can have a recess or other mating arrangement on its top and the device can have a projection or other matching arrangement on the bottom of its base that fits within the recess in the top of the custom add-on base component or otherwise mates with it. The power supply 492 for the small form-factor computational device can be independent or derived from the eye contact interaction device.

In general such a custom optional add-on base component can be separate and distinct from the device and its base, can be distributed separately, and can contain a variety of elements that add to the functionality of the device if desired by a user.

Figure 19:
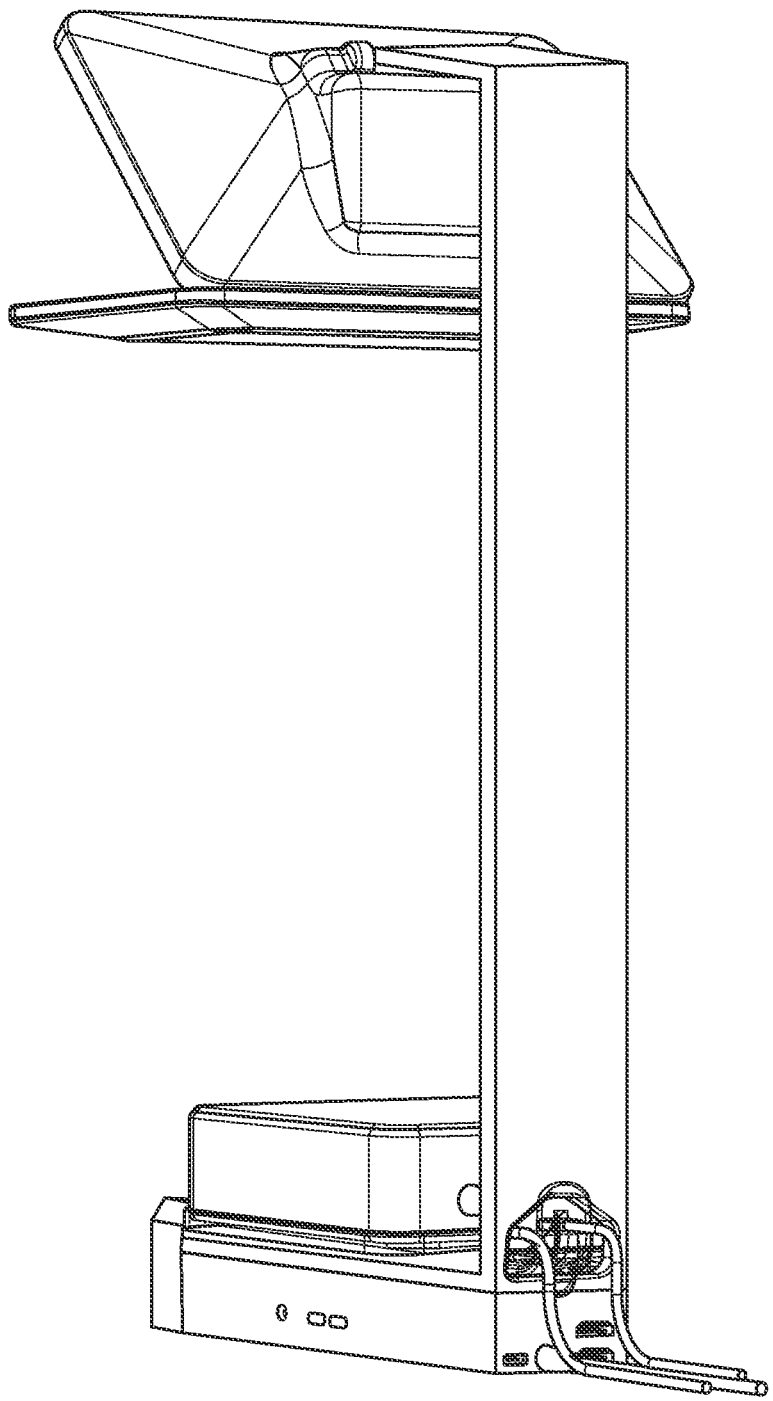
Figure 20:
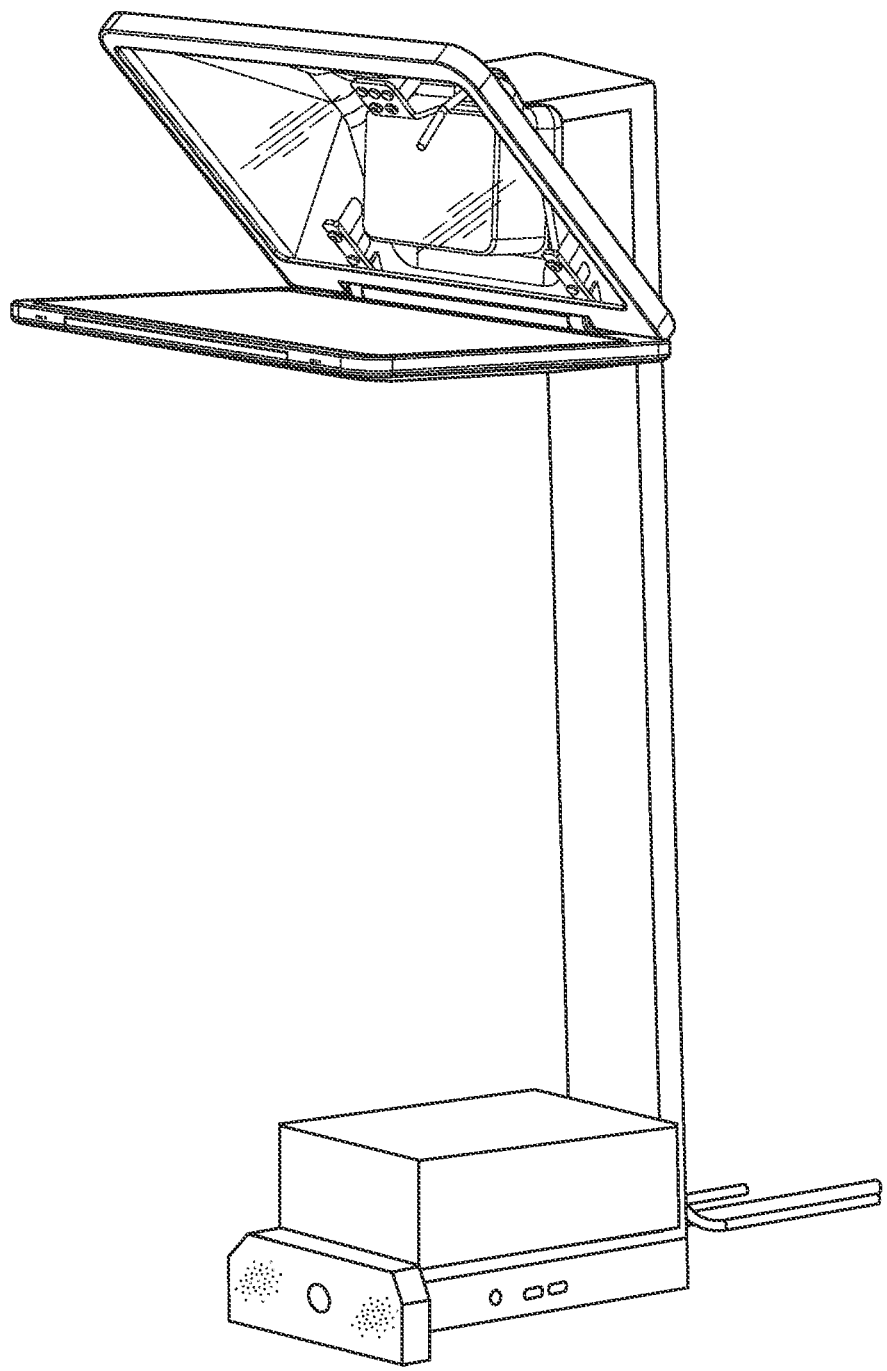

As shown in FIGS. 19, 20, and 21, in some implementations, the Intel NUC or other small form factor computer can be added as an upgrade by adding it as an intermediate component. For example, the small form factor computer could be housed within a recess of a plastic transparent frame that engages (e.g., mates with) the top of the base. This approach can have at least the following advantages: (1) It does not affect the appearance of the device when the plastic transparent frame is not in place, for those users-possibly the majority-who will use their own external PC or laptop as the computational device. (2) The frame be repeatedly added and removed without modification of the base and without requiring fasteners or screws impinging the device. (3) Being transparent the aesthetics and details of the base of the elegant device are not obscured; the frame with the small form factor computer almost appears to float on top of the base.

In some cases, as shown schematically in FIG. 22, a modular rear camera housing 802 can be provided for the interaction device 804 (see the section on modular features below). In some instances, the modular rear camera housing 802 could be configured to hold a specific affordable OEM camera 803 as a standard option. In some instances, it may be difficult to find an OEM source for supplying a relatively inexpensive high quality camera having, for example, a high quality ASP-C configuration sensor.

In some examples, as a modular option, the interaction device could include an interchangeable camera housing 806 configured for one or more commercial cameras e.g., mirrorless cameras produced by Sony, Nikon, or Canon. This would allow a user of the interaction device to buy a higher quality cameras as an upgrade to the one provided with the interaction device by simply exchanging the modular rear camera housing 802 for the optional camera housing 806 designed for the commercial cameras. Different optional rear camera housings could be for respective commercial cameras. A support component 808 of such a rear camera housing could have adjustable y-axis and z axis positions so that it could support different models with the lens aligned with the video capture axis. In some implementations in order to simplify the shielding of the lens and beam splitter from extraneous light, individual custom camera housings 810 could be offered for each different camera. Such housings could be less complex and could be custom injection-moulded for the corresponding camera model. The rear of the interaction device could have power and HDMI/USB sockets so that the cameras can be connected with appropriate cables for power and video signals. Because the power requirements of these cameras can vary the DC power could be adjustable with a mini LCD display provided to display the selected voltage.

The internal computational device can be controlled through a USB (or preferably Bluetooth) connection to an external compact keyboard with integral mouse pad 494.

Although the components are shown in FIG. 14 as being divided in a particular way among the case, the supporting stand, and the base, any one or any combination of two or more of those components could be included in any combination of the case, the supporting stand, and the base depending on the design and configuration. In addition, although the case, supporting stand, and base are shown as distinct components in a particular order or configuration, they could be organized in a different order or configuration or could be combined or further subdivided into one or two more components. For example, the case, stand, and base could be combined as a single eye contact interaction device that could be mounted on or rest on any other surface or device when in use, or be held as a portable unit.

Figure 15:
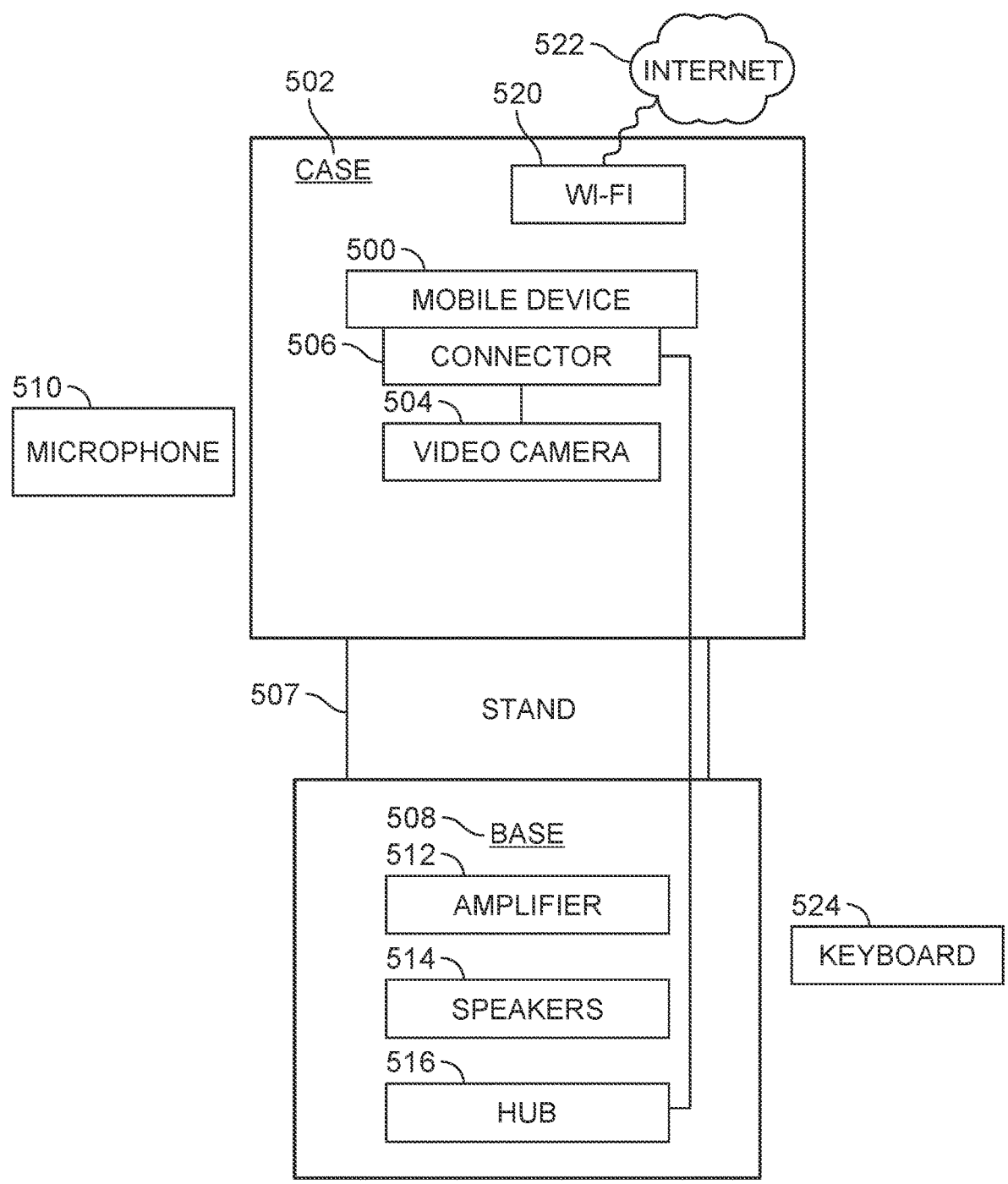

Configuration H—Embedded Tablet Serving as the Video Display and the Computational Device As shown in FIG. 15, in this configuration H, a mobile device 500 such as a tablet can be incorporated into the case 502 of an eye contact interaction device and can both replace the video display and serve as the computational device running the video interaction platform (such as ZOOM) to host an eye contact video interaction session. In some implementations of such a configuration, the video camera 504 in the case would be plugged into a USB-C connector 506 in the tablet to replace the inbuilt camera in the tablet and to maintain eye-to-eye contact. The case would be configured to allow insertion of the tablet to replace the inbuilt video screen and the case would be supported by a stand 507 and base 508 or a tripod.

Most tablets contain microphones and speakers. An external microphone 510 and an audio amplifier 512 and speakers 514 contained within the base of the eye contact interaction device can be attached through a USB hub 516 built into the base and attached to the USB-C connection 506 of the tablet.

Tablets typically have WiFi or inbuilt 4G SIM card technology 520 for independent connection to the Internet 522. That technology can be used to connect the eye contact interaction device to the Internet.

A separate keyboard 524 that communicates using Bluetooth can be incorporated within the base or be external to the base.

An eye contact interaction device designed to incorporate a tablet in this configuration could be less expensive than the full-featured Configuration G described above which could include the cost of a dedicated suitable tablet. Not all tablets would be suitable and connecting a video camera as an external source may not be straightforward with some mobile devices such as iPads running iOS. A Windows-based or Android-based tablet may be more suitable, such as a Windows 10 Microsoft Surface Go 2.

An alternative to having the participant supply the tablet in Configuration H would be to incorporate a suitable tablet-style device into the case as an alternative to having a separate video display and including an integral computational device in the base. An advantage of having a separate video display and a separate computational device in the base as described above is that those individual components can be specified separately and customised according to requirements. For example, a touch screen would not be required for an eye contact interaction device having a keyboard or touch pad in the base.

In some instances, one structural design can serve as a low-cost eye contact interaction device requiring an external computer or as a full-featured device including 4G SIM card allowing connection to the Internet even without Wi-Fi. The keyboard and touch pad could be detachable and could fit into the base which could have speakers, connectors for microphone input and other features as described above.

Uses of an Eye Contact Interaction Device

In some modes of use, to operate, control, and interact with the eye contact interaction device, a participant can download and install a mobile application on a mobile device (such as a smart phone) that enables a wireless connection (for example, a Bluetooth connection) to be initiated and maintained between the mobile device and the eye contact interaction device. The application can present menus on the display of the mobile device enabling the participant to interact with and control the eye contact interaction device by navigation of the menus. Signals generated as a result of the user interaction can be applied to an application running on a computational device of the eye contact interaction device. In some examples, the mobile device therefore acts in some sense as a remote control for the eye contact interaction device.

In some implementations, the participant can interact with and control the eye contact interaction device using, for example, a Bluetooth mouse or keyboard or both that are wirelessly connected directly to a computational device of the eye contact interaction device. Participant interaction in some examples can be through a user interface shown on the video display of the eye contact interaction device.

Based on use of the application running on the mobile device or on the computational device in the eye contact interaction device, a participant can initiate, perform, manage, and terminate, for example, the following functions and combinations of two or more of them: (a) Turn the eye contact interaction device on or off; (b) pair the mobile device or the wireless mouse and keyboard to a different eye contact interaction device using a Bluetooth or other wireless connection or a cable; (c) register the eye contact interaction device to one or more participants (by linking an account of the one or more participants to that device); (d) cause the eye contact interaction device to connect to the Internet; (e) login to an account; (f) navigate on, control, and turn on and off, any registered eye contact interaction device linked to a primary participant's account; (g) upgrade firmware or software; (g) toggle a mute function on and off; (h) toggle an availability status among options that include available, away, and not available; (i) adjust language settings and regional settings; ( ) adjust audio and visual settings, for example, intensity of light projected onto the participant, adjust camera zoom settings and focus range, adjust brightness and colour settings for the video display, sound volume, sensitivity of a microphone, or whether a screen saver will be used; (k) adjust the position, location, and orientation of the eye contact interaction device (for example, if servo motors are installed, the unit could adjust orientation or height); (l) specify and change functions of one or more physical buttons (for example, to cause a physical button to serve as a "mute on/mute off" switch or to change the function of that button to readjust video display rotations, zoom in and zoom out, or aspect ratios); (m) navigate an "app store"; and (n) install, login, manage, initiate, and terminate one or more telecommunications applications and services.

The settings of an inbuilt camera, e.g., focus, exposure, resolution, white balance, zoom, and others, and combinations of them, can be set in a variety of ways. These include (1) software running within the computational device, (2) using a physical touch screen or mechanical switches on the rear of the camera or device, and (3) remotely using wireless or Bluetooth communication with an app on a smart phone.

The telecommunications applications and services could include, for example, one or a combination of two or more of the following. (a) Zoom; (b) Microsoft Teams; (c) Google Meet; (d) Slack; (e) Skype; (f) WhatsApp; (g) FaceTime; (h) Messenger; and (i) others. The eye contact interaction device is therefore video-interaction-platform agnostic.

In one simple use case, a participant could use her smartphone to navigate a menu and initiate a Zoom session on a nearby, "paired" eye contact interaction device and then invite participants to the session.

Accounts and Device Registration

Typically, a participant could create a distinct participant account for each of two or more eye contact interaction devices themselves through the application running on the computational device. In some cases, the account could link a specific eye contact interaction device to a video interaction platform. For example one account could be identified as "Michael's Eye Contact Interaction Device at Home on Zoom" and another account could be identified as "Michael's Eye Contact Interaction Device at Work on Teams". This account technique allows one or more eye contact interaction devices themselves to be added or removed as participants in one or more video interaction sessions of a video interaction platform. This arrangement enables a participant both to login to a video interaction session from his desktop computer (for example, in order to share content from his desktop computer screen) and also be logged into the same video interaction session through his eye contact interaction device, which can be used as a primary channel for eye contact interaction.

Registering specific accounts for respective eye contact interaction devices also allows a participant to manage more than one eye contact interaction device remotely using software controls, for example, as described above (using a mobile device app or an application running on one of her registered eye contact interaction devices). This allows a participant to login to different eye contact interaction devices remotely. For example, a participant at home could use one eye contact interaction device at home to operate and activate another eye contact interaction device located at her office. By this arrangement, the participant can "turn up" at a remote office by appearing as an "avatar" on an eye contact interaction device at the office. For example, imagine a CEO who is working from home, using her registered home-based eye contact interaction device. She could dial into (that is, connect to) a registered office-based eye contact interaction device from her home-based eye contact interaction device and hold open office hours for any worker physically close to the office location or her registered office-based eye contact interaction device. In some implementations, this approach could be expanded to enable multiple eye contact interaction device participants to register and access (connect to) multiple eye contact interaction devices. In the example above, other members of the executive team might also be able to connect to the "office-based eye contact interaction device" mentioned in the example.

Multiple Eye Contact Interaction Devices

A feature of the uses of the eye contact interaction device is the ability to connect a given eye contact interaction device to one or more other eye contact interaction devices. For example, a single eye contact interaction device participant may operate and use more than one eye contact interaction device simultaneously in order to have, for example, two separate, parallel eye contact video interactions. One eye contact video interaction session could be conducted from a first eye contact interaction device and involve a group of two or more remote participants. A second, simultaneous eye contact video interaction session could be conducted from a second eye contact interaction device and be with a different group of two or more remote participants. For example, imagine a single executive meeting occurring among multiple, remote executives. One executive could also have a separate eye contact interaction device running in an "always on" fashion in an interaction session with his executive assistant allowing him to pass instructions to his executive assistant during the interaction session in a way that was private with respect to other participants. For example the executive could mute all of the other sessions except the one with her executive assistant briefly to provide instructions or make a request.

Pre-Sets

Through the mobile device app or the computational device application, a participant could create pre-set shortcuts that each runs a predefined workflow. For example, by the click of single button, the eye contact interaction device could be caused to login to a preferred video interaction platform (e.g., Zoom), adjust the lighting and sound qualities to a predefined set of values (e.g., high light brightness), and dial a particular set of remote participants (e.g., the executive team).

Other Applications

A participant also can install or remove additional mobile device apps or computational device applications that are purpose-built for use of the eye contact interaction device. For example, a standalone telehealth application could apply image processing overlays onto the video and audio signals output by the computational device or the mobile device to detect physiological measurements (for example, interpret the subtle changes in pixilation in the video feed at 30 frames per second and interpret that signal as heart rate). The user interface of such an application could also optionally display information to assist in convenient video conferencing, including one or more of the following items of information: a current time and times in any number of other, preselected time zones; a time elapsed since an eye contact video interaction session started; speed or signal strength of an Internet connection at each end of the session connection); and a number of the previously connected participants currently available.

In implementations in which the camera function is provided by, say, a participant's own mobile device attached to the back of the eye contact interaction device case and in which the display signal of the mobile device is mirrored to the video display of the eye contact interaction device, the participant can be enabled to initiate an eye contact interaction session through a dedicated mobile device application that simplifies the set-up of the session for the participant regardless of which video interaction platform is used. For example, participant might click on "Zoom call" to cause the display to configure itself automatically to optimise the participant's experience through the eye contact interaction device.

Other Features and Considerations

The Support

Figure 9:
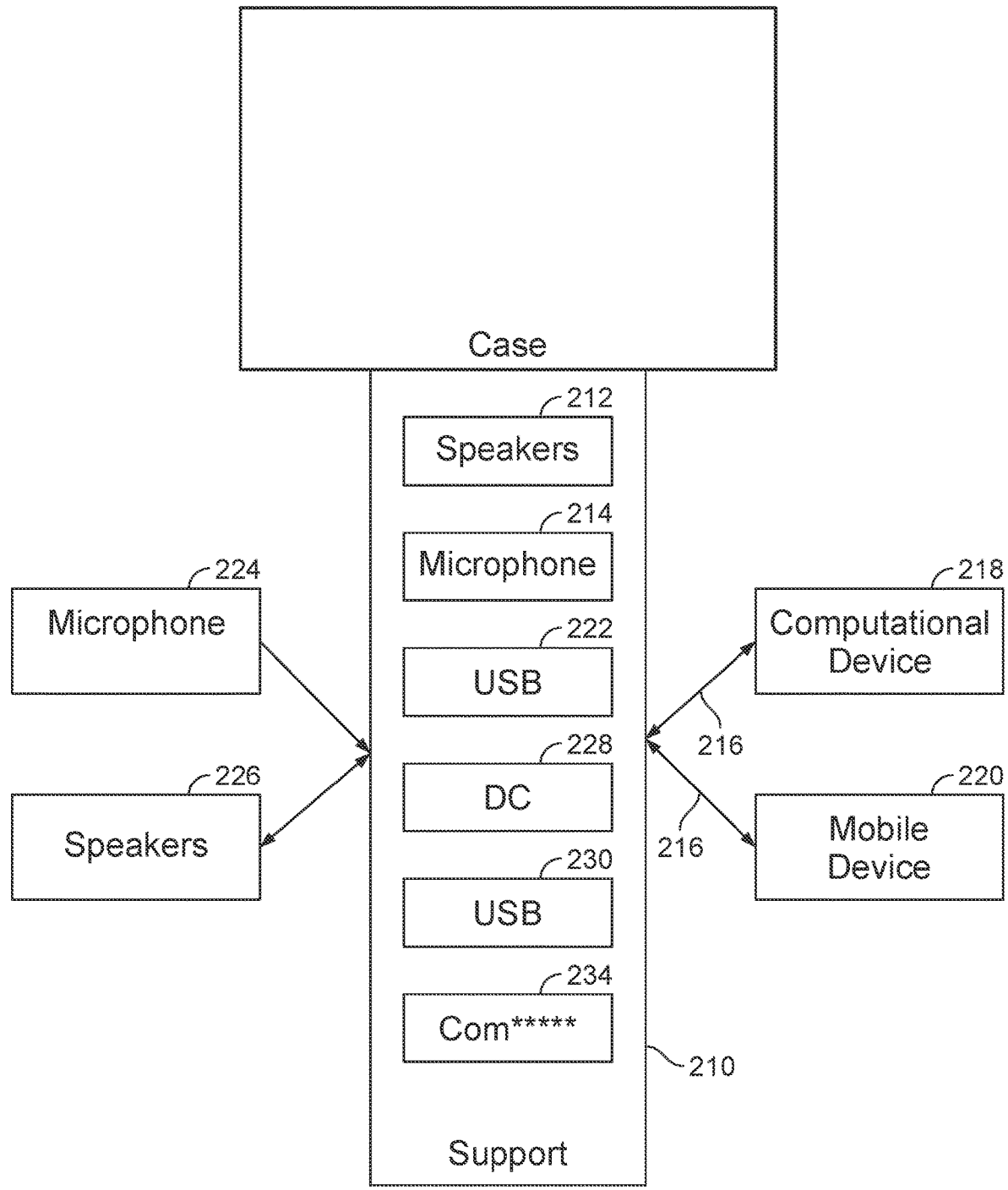

In some implementations, as shown in FIG. 9 and mentioned above, an integral support 210 could be attached to the bottom of the case or formed as part of the case. The support could incorporate integral speakers 212 and an integral microphone 214 and include a capability for Bluetooth or wired connections 216 or both to the computational device 218 or to the mobile device 220 or both. In some cases, the connections to the computational device or to the mobile device could be made directly through the support into the case. The support also could have a socket 222 to accept a USB connector of a separate high quality microphone 224 to replace the inbuilt microphone of the support. External speakers 226 could also be attached to the support as an alternative to the inbuilt speakers. In addition the support could act as a hub providing DC voltages through a DC socket 228 or USB ports 230 as required for the video display, the video camera, the mobile device, or the small-form-factor computational device, or combinations of them. This would allow a single power connection to the support to be used to serve all of the components.

In some cases the support could contain an integrated small-form computer 234 that would initiate and conduct the video interaction as described above.

Power Distribution

In some implementations, the display requires 7 to 12 volts and a mobile device such as an iPhone requires 5 volts. To serve these needs, a single 9-volt DC power converter can be attached to a buck transformer (for example, https://www.altronics.com.au/p/z6334-dc-dc-buck-module-3-40v-input/) and placed in an inline 3D mini case. A lead with a 2.1 mm DC plug to carry 9 volts DC could provide power for the video display. A 5-volt DC lead ending in an Apple Lightning plug could supply power to the mobile device. Configurations of the video interaction device that use mobile phones or other mobile devices could therefore be self-contained, able to initiate eye contact video interaction using the video interaction platform and would have only a single power cable for all components. A support could be configured to contain similar power distribution circuitry.

Projector Alternative

In some implementations, a compact LED or DLP projector can be used as a replacement for an inbuilt video display. Typical such projectors may not be as bright as an LCD or LED or IPS flat screen displays. The use of a projector would also require a semi-reflective screen in front of the case on which the image could be projected, which could interfere with the video capture by the video camera. A projector could also be utilized to project a display on a screen in the location of the integrated video display as a replacement for the integrated video display.

Display Magnification

In some cases, enhancing an eye contact interaction device with a magnifier for the video display could enhance the participant experience. For example, a 2× Fresnel lens could be placed in front of the video display surface. This approach may cause reflections on the video display and interfere with the focus function and image quality of the video camera; these concerns could be addressed using better quality lenses and focus strategies for the video camera.

Modularity

Figure 10:
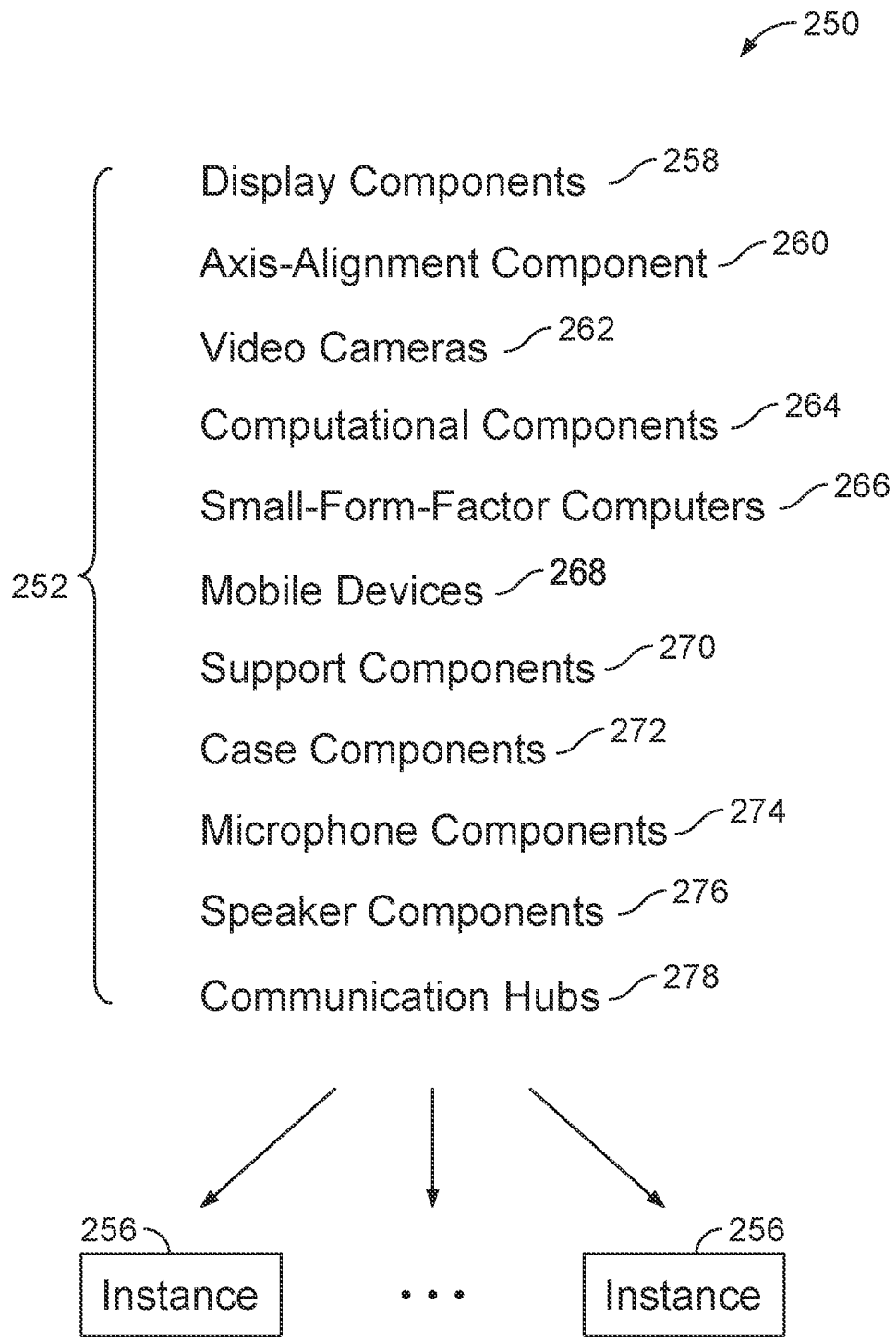

In some examples, as shown in FIG. 10, the eye contact interaction device can be designed and marketed as a modular system 250 in which various available components 252 and various models or types of given components can be included or not included and later added or removed to produce device instances 254, 256 all derived using the same complement of available components. As a result the consumer can be presented with a broad choice of possible instances, can easily make changes in the complement of components for a given instance of the modular system, and can reduce cost. In addition to choices of which complement of components to choose in the modular system, the consumer also could be given choices among different products to serve the function of a given one of the components. For example, if the consumer chose to include a video camera in a modular system a choice could be offered among three (or more) different video cameras to serve the function of the video camera component. In some cases, three different video device configurations and three different supports could be made available to enable nine different products to be offered from the modular system.

We use the term "components" broadly to include, for example, one or more of a video display 258, an axis-alignment device 260, a video camera 262, a computational device 264, a small-form-factor computational device 266, a mobile device 268, a support 270, a case 272, a microphone 274, a speaker 276, a communication hub 278, and other components, and combinations of them.

In such a modular system, the support could include, for example, (a) only the power hub feature, (b) the power hub feature and one or more of an embedded Bluetooth-capable speaker and Bluetooth-capable support, or (c) the power hub feature with such a speaker and microphone and an integrated small-form computer.

Also, in such a modular system, the case could include an integrated video display designed for use with an iPhone or other mobile device, an integrated video display and an integrated high end video camera, or an integrated video display designed for mirrorless cameras such as the Canon M200, among a wide variety of combinations of components.

A video interaction device could include various cases combined with various supports for maximum flexibility. In some instances, constraining the support and case options to two could be especially practical.

A wide variety of other modular features and configurations would also be possible.

Controlling the Video Interaction

The user interfaces presented by the video interaction platform for controlling the eye contact interaction device can include buttons, menus, dialogs, and other interface controls that are clicked or into which information is typed by touching a surface of a display or typing or manipulating a mouse or other cursor control device. The video interaction platform can be controlled in a wide variety of ways, including the following techniques and combinations of them.

1. The computational device can be controlled using connected devices such as a keyboard, a mouse, a touchpad, and combinations of them, and wirelessly from a wireless controller communicating on a Bluetooth or other wireless connection.

2. The eye contact interaction device could include components for controlling the video interaction platform by gestures. The gestures could be expressed by head, hand, or finger motions or orientations performed, for example, "in the air". Finger motions could be expressed by strokes on a display or other touch sensitive surface. In some embodiments, the eye contact interaction device could have a touch screen or touch pad on one of its side (e.g., the top, any side, or the bottom) to allow finger gestures and swipes to control the eye contact interaction device and all functions. For example, a wave of the hand could cause the eye contact interaction device to be turned on or off.

3. Control of the user interface could be implemented using voice or speech interpreted by the computational device or the mobile device.

Modes of Access and Modes of Use

Access by a participant to control and use the eye contact interaction device has been described above as an activity performed locally using direct input to a user interface presented on or by the computational device, for example. Other modes of access are also possible including one or more of the following.

In some instances a device (such as a computer or laptop or mobile device) located remotely from the eye contact interaction device could control the eye contact interaction device and also control the eye contact video interaction being supported by the eye contact interaction device. In effect, this arrangement extends the distance between the eye contact interaction device and a participant who controls the operation of the eye contact interaction device. The participant in control of the eye contact interaction device could be a different person from the participant who is engaging in the eye contact video interaction at the eye contact interaction device.

As an example, a local participant could be a patient at home and the remote participant could be the patient's doctor working from home. Both can be using an eye contact interaction device. The doctor, even though remote from the patient, can have control over the eye contact interaction device in the patient's home including the ability to turn the patient's eye contact interaction device on and off, cause the video camera of the patient's device to zoom in and out, and a variety of other control activities. The control activities can be expressed by the doctor through an interface of the computational device in the doctor's home, for example, and be carried through the Internet to the computational device at the patient's home for execution.

The control from one location of an eye contact interaction device at another location could be achieved remotely through the Internet or mobile broadband, for example. Such arrangements can be useful to access an eye contact interaction device that has been placed at some distance from the local participant. For example, the local participant could, from home, control an eye contact interaction device located at an office. In effect, the local participant could "drop in" to the remote eye contact interaction device, and control its operation, as if he were physically local to the device, but without having to be physically close to the device. In some cases, this could be accomplished by communicating the signal from the video camera in the local eye contact interaction device to the eye contact interaction device at the office and communicating the signal from the video display of the eye contact interaction device at the office to the local eye contact interaction device. In effect the eye contact interaction device at the home becomes an extension of the eye contact interaction device at the office.

This technique could be applied by a participant to control one or many eye contact interaction devices. In this way, the local participant could control his eye-to-eye video interactions with each of several remote participants individually and do so one-by-one, unlike some other implementations in which the local participant's eye contact video interaction is hosted in essentially the same mode for all of the remote participants. Among other things, this technique would allow the local participant to use one eye contact interaction device to support separate independent eye contact video interactions simultaneously with individuals or groups of individuals during the course of an interaction session. Such implementations could be achieved by creating new software or enhancing existing software for a video interaction platform and by enhancements to the eye contact interaction device.

In some cases, using multiple standalone eye contact interaction devices simultaneously would facilitate this technique and enable multiple, parallel, eye contact video interactions with the option to connect different groups of participants in different, synchronous conversational networks. Facilitating videoconferencing using discrete independent eye contact interaction devices at a given location would enable new and unique conversational arrangements.

In some examples, the use of multiple local eye contact interaction devices each with integrated control (for example, using inbuilt computational devices and communication software for each of the devices) connected to different remote participants in distinct parallel video interactions would support a virtual workplace similar to a group of individuals in a common physical workplace. The image of the local participant sent to the remote participants would in essence be an avatar of the local participant. The local participant who has the multiple eye contact interaction devices on his desktop can communicate with each avatar of a remote participant separately or engage in a group conversation. The different avatars that appear on the displays of the multiple eye contact interaction devices can also communicate with each other if the video camera of one or more of the eye contact interaction devices has a field of view that includes the displays of one or more other eye contact interaction devices. In effect, two or more of the multiple eye contact interaction devices on a local participant's desk can provide a "tunneling" capability between two or more of the remote participants so that the remote participants can have eye contact interactions with one another even without involvement of the local participant.

Similarly, groups of participants can have separate distinct eye contact video interactions among them.

Figure 11:
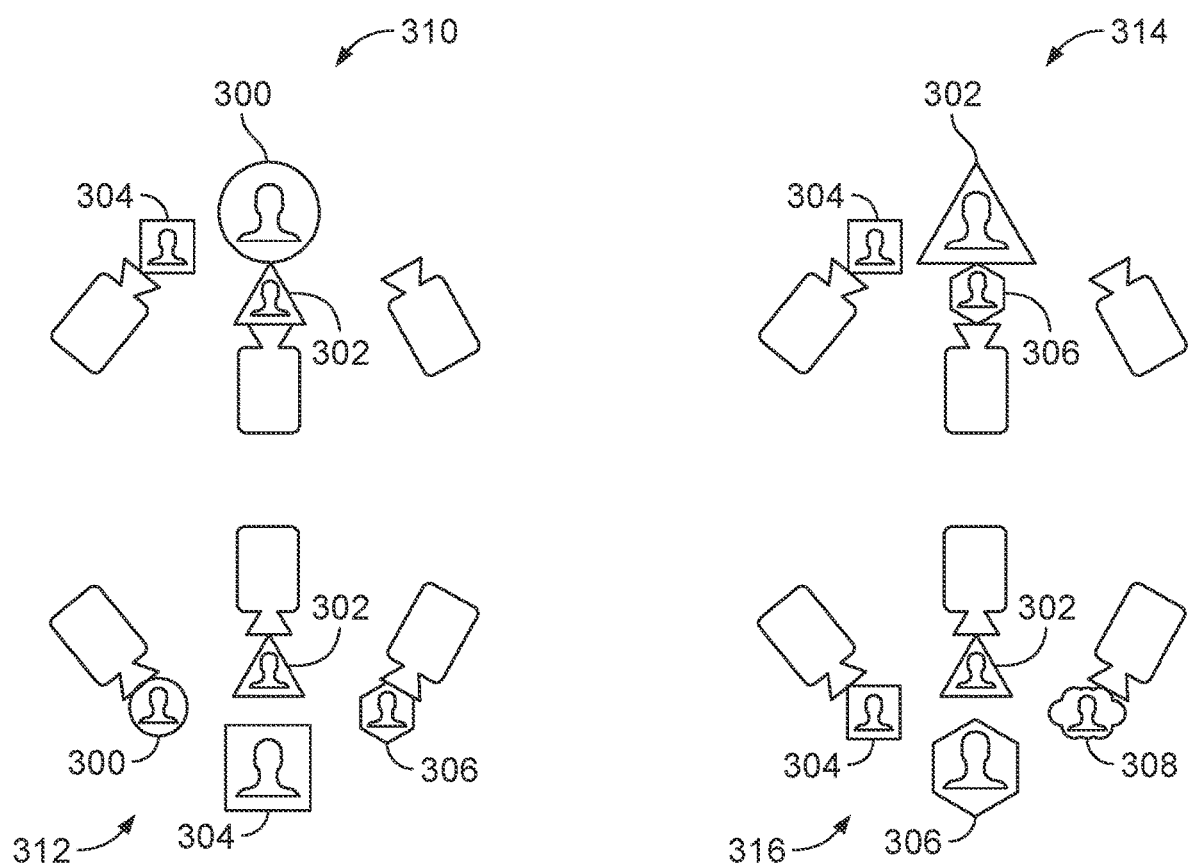
FIGS. 11 through 13 are schematic diagrams.
Figure 12:
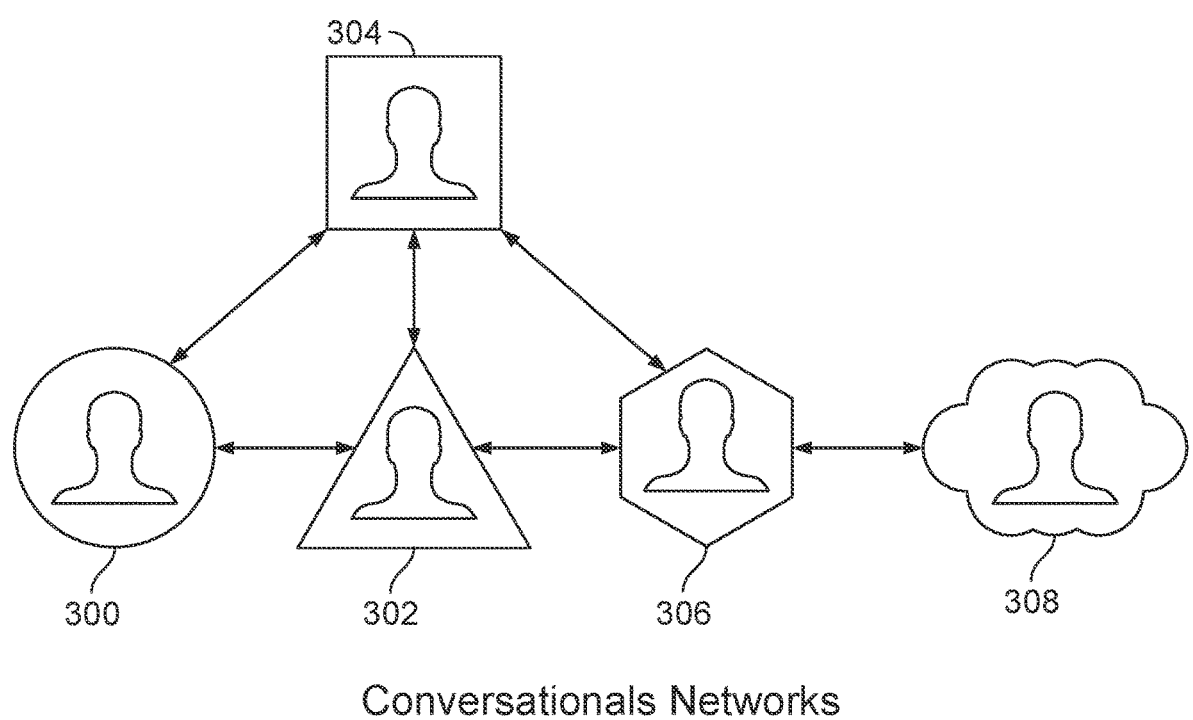

As shown in FIG. 11, for example, of five participants 300, 302, 304, 306, and 308, four of the participants at four locations 310, 312, 314, 316, each has three eye contact interaction devices (depicted as cameras) enabling a local participant at each location to have eye contact video interactions with the indicated other participants. In the figure, participant 300 can have eye contact interaction with participants 302 and 304, for example, and participant 302 can have eye contact video interaction with participant 304 and 306. These five participants can then have eye contact interactions in much the same way as if they were co-workers who normally share an open office plan and where participant 308 is an executive assistant to participant 308, as also illustrated in FIG. 12.

Another mode of access making use of eye contact interaction devices could be in private highly secure networks.

Although many of the examples discussed above involve relatively formal unspontaneous uses of the eye contact interaction device, for example, for interaction sessions that are among expected participants and begin and end at expected times, a variety of other modes of use, including less structured, less formal modes are also possible and useful.

For example, in some situations, it could be advantageous to have the eye contact video interaction device powered on and operational either at all times or semi-permanently. In this approach the interaction device would serve as an open virtual window or portal on the participant's office desk or in another room (such a lounge room) or a wide variety of other public or private locations.

In effect the open window or portal would provide a channel of informal access for remote participants to engage in electronic conduct that is similar to real-life "dropping in" or "stopping by". The remote participant could initiate an interaction session with the local participant at any time and under any circumstance, including unannounced, simply by connecting to the local participant's always on eye contact interaction device and starting a conversation.

When the eye contact interaction device operates in an "always on" mode, it can provide a virtual window or portal beside the main participant that others can "drop into" or "stop by"-thereby approximating the working experience of an "open office" where such drop-ins and chance encounters are more common.

The practice of more people working from home has reduced the random live face-to-face interactions that occur spontaneously and frequently at a typical physical workplace. Working from home reduces opportunities for spontaneous conversation and real-time problem solving with others. The eye-contact interaction devices can establish a virtual environment similar to the real-life open-office environment in which a remote participant can virtually "knock" on the local eye contact interaction device and be let in by the local participant.

As mentioned earlier, in some instances, a local participant could maintain two or more eye-contact interaction devices to facilitate multiple, synchronous but separate conversations with different remote participants. In some cases, a participant can be "cast" to more than one eye contact video interaction device simultaneously.

Degree of Separation of Participants

Eye contact video interactions can occur across a wide variety of physical separation distances. For example, the physical distance between the participants need not be as great as implied by the separation distances of different buildings, different streets, different cities, or different countries as might be typical of video conferencing. In some cases, the participants could be as near to one another as on opposite sides of a wall, or at two locations in a room, office, store, or other place, or on two floors of a building, for example.

More generally, one or more eye contact interaction devices can be useful in any context in which any degree of physical separation between the participants is desirable or necessary or extant. Among others, the context could include security contexts in which the participants are near to one another (within a single room or space, for example) but separated by a wall or barrier or screen and medical contexts in which the participants need to be quarantined or otherwise isolated from one another (for example to avoid transmission of disease from one to the other). Situations in which one of the participants has limited ability to communicate or move, for example, a patient, and the other participant is a caretaker who may be located nearby (in the same building) or at a great distance provide opportunities for use of the eye contact interaction device. Retail and other commercial activities can also benefit from the use of eye contact video interaction when close proximity or contact is risky or undesirable or not practical. Some applications can include systems for banks, live bank tellers, service station managers, building entry, and a wide variety of others. Among others, any kind of customer service or instruction style interaction could benefit from use of the eye contact interaction device especially in contexts in which the participants need to be separated for health, safety, security, personal comfort, or other reasons.

The requirement of social distancing associated with Covid-19 and other diseases can in some contexts be met by using the eye contact video interaction device.

Places of Use

Much of the earlier discussion has described uses in which the local participant is situated in a private context, such as at home or in an office. In some implementations, the eye contact video interaction device can be located temporarily or permanently in a variety of locations that are public or semi-public.

In emergency rooms of medical and health centres, for example, a patient as one participant could be triaged without risk to a health care worker until a determination is made that the patient could be given physical access to the facility.

In some cases, a patient who is not able or permitted to have live guests, such as a person being quarantined, can have eye contact video interactions with family members or friends.

For remote medical appointments or general telehealth consultations, eye-to-eye contact achieved by the eye contact interaction device can improve clinician-patient rapport. Particular clinical examinations ("let me look at your throat" or "say 'ahh'") could also benefit from a better viewing plane than is possible with the eye contact interaction device.

Interviews of employment candidates would be a useful application of the technology. When international and regional travel is restricted, as has happened for example during the COVID-19 pandemic, live face-to-face interaction is sometimes not possible in job interviews and eye contact video interaction can be useful in this process.

Journalists or podcasters who are engaged in "live" interviews with people who are not physically present can benefit from the high degree of engagement offered by eye contact video interaction.

Other places where eye contact video interactions can be especially useful include bank teller windows, automatic teller machines, help kiosks located within buildings or rooms or outdoors (for example at car rental offices, airports, grocery, or grocery stores), ordering stations at drive-through restaurants, hotels (including concierges), security guard posts, customer support and help desk centres, schools, other educational institutions, and prisons, to name a few.

Hand-Held Eye Contact Video Interaction Device

A hand-held or portable self-contained eye contact interaction device can be useful in certain contexts. Such a device could have one of the configurations discussed earlier (including an integrated computational device) and be made fully portable by having an internal power supply (e.g., a battery), a 5G SIM card (for wireless communication through the cellular network) and a "pistol-grip" style stand so it could be comfortably carried and manipulated. The bandwidth offered by a 5G network could allow for mobile, high resolution, two-way, high definition video calls with eye contact video interaction. In some examples, the hand-held device could be used in a "TV breaking news, on the spot" interview of someone at a scene, by a reporter or a bystander having eye contact video interaction with a host in a studio.

Components and Features

In some embodiments, additional sensors or devices or other technologies, and combinations of them, may be incorporated in or provided as accessories to the eye contact interaction device.

For example, information about a local participant could be acquired at an eye contact interaction device and transmitted to a remote participant for use at another location. In some cases, a near infrared sensor could support facial recognition of the local participant to be used by a remote participant. Such an infrared sensor also could be used to measure a temperature of the local participant. In some applications the remote participant could use the temperature information, for example, to decide whether to admit the local participant to a building or a room or another space. More generally, eye contact interaction devices can facilitate capture and verification of biometric information about the local participant for medical or security purposes.

Types of Interactions

Much of the description above addresses the use of the eye contact interaction device in contexts such as meetings, video calls, conferences, webinars, medical appointments, parties, social gatherings, classes, podcasts, lectures, seminars, board meetings, and discussion groups. Often such events have a start time and an end time, are scheduled in advance, involve identified participants and are conducted as gatherings that cover one or more subjects by discussion of the participants.

Many uses and applications are possible in which a local participant and a remote participant have an interaction for which eye contact video interaction is necessary, desirable, or preferred.

In some implementations, a local participant could control the location and motion of an eye contact interaction device within a remote space to enable realistic participation in the environment of the remote space while engaging in, for example, a video conference. Motion of this kind is offered, for example, by the Beam™ product of Suitable Technology as illustrated at https://suitabletech.com.

Two-Way Eye Contact Interaction

Although some of the examples discussed above involve use of a local eye contact interaction device with a conventional non-eye-to-eye device at the remote end of the communication channel, the experience for both the local participant and the remote participant is better if eye contact interaction devices are used at both ends.

Integrated Light Source

In some implementations, an integral light source can be included in the case to illuminate the capture field of the video camera and optimize the quality of the video. The light source could be an LED light mounted on the case and adjustable for orientation and position. In some implementations, the LED light could be extensible and attached by, for example, a mini ball head screw as used for tripods https://www.amazon.com.au/AKOAK-Swivel-Tripod-Camcorder-Bracket/dp/B01CQAQOSI so that the light could be angled appropriately. See, for example, https://www.leedervillecameras.com.au/products/tripods-flashes/led-video-lights/litufoto-f12-led-video-light.

Voice Command

In some cases in which voice commands or sounds are used to control an electronic device, such as Facebook's Portal or Google's home hub, incorporation of some or all of the components of the eye contact interaction device into such an electronic device to provide it with eye contact interaction capabilities could significantly improve the user experience. In operating the eye contact interaction device by voice command, a microphone could be set to listen for specific voice commands and perform any of the functions described earlier based on the voice. A participant could download and select among any number of third-party voice-driven AI assistants such as Siri (Apple) or Alexa (Amazon).

In some cases, the eye contact interaction device can track a voice as it moves about a room. For example, when this setting is activated, the eye contact interaction device will pan left to right to follow a participant who is speaking and walking back and forth in a room. The eye contact interaction device could also zoom in towards the voice of speaking participants.

Dioptric Correction

In some implementations, the eye contact video interaction device could include a mechanism for providing dioptric correction of the displayed video to accommodate short-sighted and long-sighted participants. The dioptric correction mechanism could include electronic or manual controls for adjusting the focus of the image for the participant.

Incorporation of the technology into a variety of other electronic devices could make them more effective, useful, and secure.

Other implementations are also within the scope of the following claims.

Figure 17:
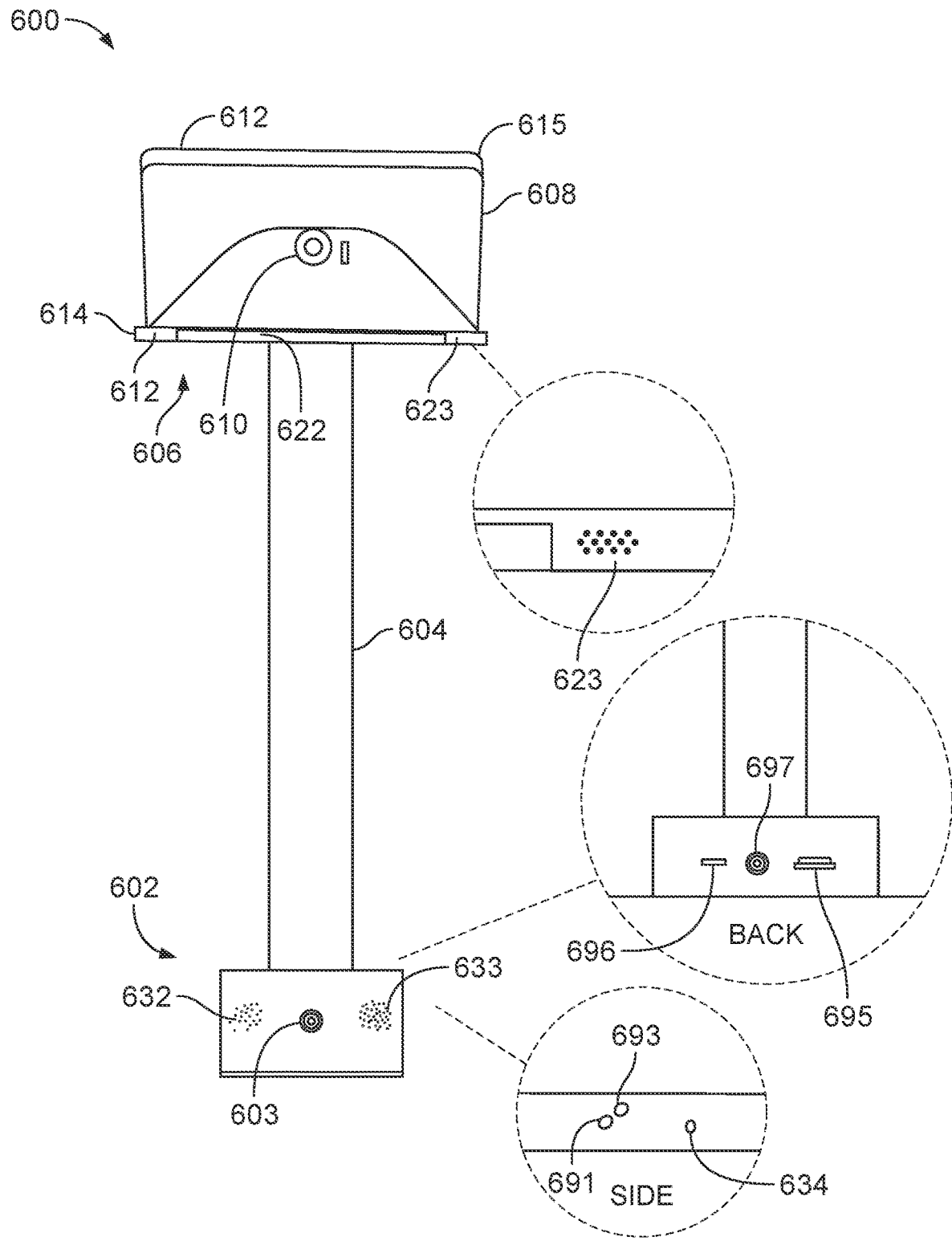
Figure 18:
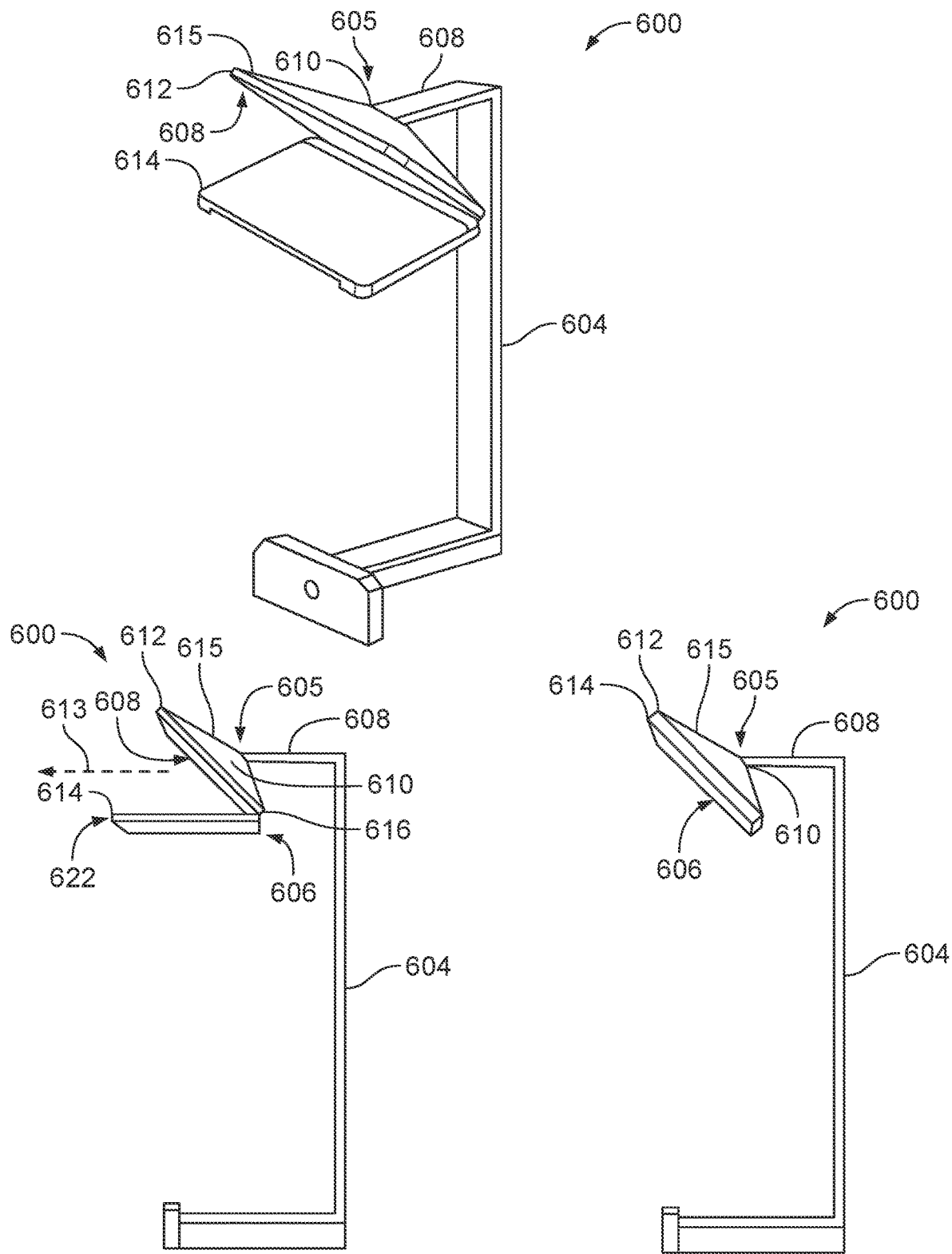

For example, as shown in FIGS. 16, 17, and 18 in some implementations, an eye contact interaction device can take the form of an elegant desk top appliance 600 serving also as a desk lamp.

The appliance includes a base 602 configured to be heavy enough or otherwise stable enough to support the appliance on a surface without an undue risk of the appliance falling over. A stand 604 extends upward from the base to a point 605 where an interaction assembly 606 is mounted. The stand can be integrated with the base as one continuous piece or can be distinct from and attached to the base. The stand can have a top segment 608 that extends toward a user of the appliance and the interaction assembly can be attached to or suspended from a fitting 610 at the upper end of the stand. The stand can house, among other things, cables running between the base and the interaction assembly to carry power and signals for a variety of purposes as discussed elsewhere.

The interaction assembly includes an upper component 612 and a lower component 614 connected in a clamshell fashion by a hinge 616. The hinge is configured to enable two or more stable orientations of the lower component relative to the upper component. In one stable orientation the lower component is held horizontally which orients it at a 45 degree angle to the upper component. In some examples, the upper component is held fixed in an orientation that is at 45 degrees relative to the horizontal surface on which the appliance rests.

From the first stable orientation, the lower component can be pushed upward to cause it to pivot about the hinge and eventually to reach a second stable orientation in which the lower component is closed against the upper component. When in use the interaction assembly would typically have the lower component and the upper component in the first stable orientation.

When the appliance is not in use, the interaction assembly can remain in the first stable orientation, or can be placed in the second stable orientation with the operational surfaces of the interaction assembly hidden from view. In the second orientation, the appliance can serve as an elegant desk lamp as shown in FIG. 18.

Magnets or friction or another mechanism and combinations of them can be used to hold the interaction assembly open or closed or in intermediate orientations between fully opened and closed. When the interaction assembly is closed, the screen of the video display and the surface of the beam splitter glass are protected.

The upper component and the lower component of the interaction assembly together provide, in a compact and elegant assembly, many of the elements and features of one or more of the configurations described above.

The upper component includes a beam splitter glass 608 which reflects what is displayed on the video display 619 below and allows light to pass through to a compact video camera 610 mounted behind the beam splitter glass. In some applications, the video capture axis 609 of the video camera is directed toward the eyes of the participant and the stand places the interaction assembly at a level such that video capture axis 609 can be horizontal when directed to the eyes of the participant. The compact arrangement for the video camera is made feasible by locating the circuitry for the video camera in the lower component; then the remaining imaging sensor and lens of the video camera are compact and can be housed behind the beam splitter glass in the upper component. The upper component includes a housing 615 that shields the lens of the video camera from ambient light to maintain the quality of the captured video. The space between the beam splitter glass and the video display, on the other hand, need note be shielded, enabling a streamlined design.

The housing 615 can also contain other elements useful in the functioning of the appliance including elements described for other configurations of the eye contact interaction device.

The bottom component includes a video display 619 held in a housing 620 with a display screen facing the beam splitter glass. The housing also can contain one or more microphones 621, 623, and a variety of other elements useful in the functioning of the appliance including elements described for other configurations of the eye contact interaction device.

The housing also can contain a light 622 in the form, for example, of a horizontal fluorescent lamp or a horizontal array of LEDs. The emitted light (including its intensity and spectral features), can be turned on and off and otherwise controlled manually from one or more physical switches or wirelessly from a mobile device or can be controlled electronically by a computational device that is part of the appliance.

The light can serve to illuminate a face of a participant who is engaging in an eye contact interaction or to illuminate other parts of the camera lens field of view or can serve as a desk lamp, for example, when the interaction assembly is in the second orientation, or can serve as both. One or more other lights can be mounted on the interaction assembly in a variety of positions and orientations. Because of the dual function of the light, the appliance does not take up non-functional desk space when the appliance is not being used for eye contact video interaction.

The base includes a housing 630 containing one or more speakers 632, 633, control buttons including volume control buttons 691, 693, and signal ports such as an audio jack 634, a small form factor computational device, cable connection points for HDMI 695, USB-C 696, and DC power 697, for example, and a variety of other elements useful in the functioning of the appliance including elements described for other configurations of the eye contact interaction device.

The housings 615 and 620 can together be considered a case, one which is simpler and perhaps more elegant than the case implementations described earlier.

The hinge 616 is configured to enable a range of possible stable orientations for the lower component relative to the face of the participant so that the video capture axis is aligned with the participant's gazing axis. The fitting 610 also can be arranged to permit one or more degrees of freedom of rotation so that the entire interaction assembly can be oriented as desired. This feature can be useful not only for directing the video capture axis when the interaction assembly is open and in use for eye contact video interaction, but also to adjust the direction in which light emanates from the lamp when the interaction assembly is closed.

The electronic components for operation of the appliance can be located in the interaction assembly, the stand, or the base, or combinations of them.

In some implementations, the eye contact video interaction device includes a physical mute switch that can be used in addition to or in place of a software mute switch presented by the user interface of a video interaction platform.

In some implementations the computational device can be external to the main structure of the appliance and could be placed, for example, on a shelf that is part of the base.

The invention claimed is:

1. An apparatus comprising:
    an assembly comprising:
        a beam splitter having a front surface and a rear surface,
        a video sensor and an optical lens mounted within a housing that faces the rear surface of the beam splitter, wherein the housing is a modular housing configured to be interchangeable with a second housing containing a second video sensor that is of a distinct model compared to the video sensor, and wherein the optical lens has an optical axis extending from the video sensor through the beam splitter, and
        a video display at a location that faces the front surface of the beam splitter;
    a base comprising one or more speakers; and
    a stand connecting the assembly to the base, wherein the assembly is mounted to the stand via the housing containing the video sensor and the optical lens.

2. The apparatus of claim 1, wherein the stand extends upward from the base to a point where the assembly is mounted to the stand via the housing.

3. The apparatus of claim 2, wherein the assembly is mounted to the stand at a height above a work surface.

4. The apparatus of claim 1, wherein the stand comprises a top segment that extends toward a forward portion of the apparatus.

5. The apparatus of claim 1, wherein the stand is integrated with the base as a continuous component.

6. The apparatus of claim 1, wherein the stand is a distinct component from the base.

7. The apparatus of claim 1, wherein the stand houses one or more cables extending between the base and the assembly.

8. The apparatus of claim 1, wherein the base further comprises one or more control elements for controlling one or more functions of the assembly.

9. The apparatus of claim 8, wherein the one or more control elements comprises one or more buttons.

10. The apparatus of claim 8, wherein the one or more control elements comprises one or more switches.

11. The apparatus of claim 8, wherein the one or more control elements comprises one or more volume control elements for controlling a volume of an audio signal output by the apparatus.

12. The apparatus of claim 8, wherein the apparatus comprises a microphone and wherein the one or more control elements comprises a control element for muting or unmuting the microphone.

13. The apparatus of claim 8, wherein the assembly comprises a light source and wherein the one or more control elements comprise one or more light control elements for controlling an emission from the light source.

14. The apparatus of claim 1, wherein the base further comprises one or more signal ports.

15. The apparatus of claim 14, wherein the one or more signal ports comprises an audio jack.

16. The apparatus of claim 1, wherein the base further comprises one or more cable connection points.

17. The apparatus of claim 16, wherein the one or more cable connection points comprises at least one of a HDMI cable connection point, a USB-C cable connection point, and a DC power cable connection point.

18. The apparatus of claim 1, wherein the assembly comprises a mechanism associated with the beam splitter and the video display, the mechanism structured to enable an open configuration in which a reflection of a screen of the video display is visible from a point that is forward of the front surface of the beam splitter, and a closed configuration in which the reflection of the video display is not visible from the point that is forward of the front surface of the beam splitter.

19. The apparatus of claim 18, wherein the mechanism comprises a hinge coupled between the beam splitter and the video display, the hinge configured to enable relative motion of the beam splitter and the video display between the open configuration and the closed configuration.

20. The apparatus of claim 1, wherein the assembly comprises a light to provide illumination in a vicinity of the apparatus.

21. An apparatus comprising:
an assembly comprising:
- a beam splitter having a front surface and a rear surface,
- a video sensor and an optical lens mounted within a housing that faces the rear surface of the beam splitter, the optical lens having an optical axis extending from the video sensor through the beam splitter, and
- a video display at a location that faces the front surface of the beam splitter;

a base comprising:
- one or more speakers, and
- a control element for controlling a display of an indicator that marks a viewing location on the beam splitter that is aligned with a video capture axis of the video sensor; and a stand connecting the assembly to the base, wherein the assembly is mounted to the stand via the housing containing the video sensor and the optical lens.

22. An apparatus comprising:
an assembly comprising:
- a beam splitter having a front surface and a rear surface,
- a video sensor and an optical lens mounted within a housing that faces the rear surface of the beam splitter, the optical lens having an optical axis extending from the video sensor through the beam splitter, and
- a video display at a location that faces the front surface of the beam splitter;

a base comprising:
- one or more speakers, and
- a control element for controlling an aspect ratio or zoom of the video display; and a stand connecting the assembly to the base, wherein the assembly is mounted to the stand via the housing containing the video sensor and the optical lens.

* * * * *